(12) United States Patent
Hashimoto et al.

(10) Patent No.: US 6,262,418 B1
(45) Date of Patent: Jul. 17, 2001

(54) THERMAL TYPE INFRARED SENSING DEVICE, FABRICATION METHOD FOR THERMAL TYPE INFRARED SENSING DEVICE, AND INFRARED IMAGING SYSTEM AND INFRARED IMAGING APPARATUS

(75) Inventors: Kazuhiko Hashimoto, Moriguchi; Masanori Okuyama, Toyonaka; Ryuichi Kubo, Shiga; Tomonori Mukaigawa, Osakasayama, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/177,148

(22) Filed: Oct. 22, 1998

(30) Foreign Application Priority Data

Oct. 24, 1997 (JP) .................................... 9-293043

(51) Int. Cl.[7] .................................... G01J 5/10
(52) U.S. Cl. .................................... 250/338.3
(58) Field of Search .................................... 250/338.3

(56) References Cited

U.S. PATENT DOCUMENTS

| | | | |
|---|---|---|---|
| 4,258,260 | * 3/1981 | Obara et al. | 250/338.3 |
| 4,441,023 | * 4/1984 | Doctor et al. | 250/338.3 |
| 4,691,104 | 9/1987 | Murata et al. | |
| 4,745,278 | 5/1988 | Hanson. | |

FOREIGN PATENT DOCUMENTS

| | | | |
|---|---|---|---|
| 2233495 | 1/1991 | (GB). | |
| 4-355331 | * 12/1992 | (JP) | 250/338.3 |
| 5-164607 | * 6/1993 | (JP) | 250/338.3 |
| 06273228 | 9/1994 | (JP). | |

OTHER PUBLICATIONS

European Search Report dated Apr. 18, 2000, application No. 98120006.

H. Wada et al., "256×256 Uncooled Microbolometer Focal Plane Array", T.IEE Japan, vol. 117–E, No. 12, pp. 612–615, Nov. 12, 1997.

A. Tanaka et al. "Infrared Focal Plane Array Incorporating Silicon IC Process Compatible Bolometer", IEEE Transactions on Electron Devices, vol. 43, No. 11, pp. 1844–1848 (Nov. 1996).

* cited by examiner

*Primary Examiner*—Constantine Hannaher
(74) *Attorney, Agent, or Firm*—Ratner & Prestia

(57) ABSTRACT

A thermal type infrared sensing device has; a plurality of light-receiving electrodes for outputting a change of surface charge associated with a polarization that occurs in a dielectric when subjected to infrared radiation; and a plurality of compensation electrodes, corresponding one for one to plurality of light-receiving electrodes, for compensating the outputs of corresponding light-receiving electrodes, and wherein plurality of compensation electrodes are formed on a different substrate from a substrate on which plurality of light-receiving electrodes are formed.

34 Claims, 21 Drawing Sheets

THERMAL TYPE INFRARED SENSING DEVICE, FABRICATION METHOD FOR THERMAL TYPE INFRARED SENSING DEVICE, AND INFRARED IMAGING SYSTEM AND INFRARED IMAGING APPARATUS

BACKGROUND OF THE INVENTION

1. Field of the Invention

The present invention relates to a thermal type infrared sensing device, a method of manufacturing the thermal type sensing device, and an infrared imaging system and infrared imaging apparatus.

2. Related Art of the Invention

In recent years, the need has been growing for security monitoring and air conditioning control involving detecting the presence or absence of humans in a room and the amount of their activity With this trend, apparatuses for detecting infrared radiation sources by using infrared sensors have come into use in order to detect a human body by detecting the infrared radiation emitted from the human body and to control environment control equipment, such as air conditioners and lighting equipment, security systems, or the like, by using the obtained signal. Furthermore, as the need increases to detect undesirable events by monitoring the temperature distribution of an object such as a heat source in real time, the demand for two-dimensional infrared sensing devices is increasing. It is therefore desired to develop a low-cost, high-performance two-dimensional infrared sensing device.

Two types of infrared sensors are known: quantum type sensors that detect infrared radiation as photons, and thermal type sensors that utilize a change in the physical properties of the device when the temperature of the device rises by absorbed infrared radiation. Since quantum type sensors usually need cooling by liquid nitrogen or the like, thermal type sensors are commonly used. Of the thermal type sensors, the pyroelectric infrared sensor is suitable for detecting an infrared radiation source because of its high sensitivity compared with other types of thermal type sensors; however, since the pyroelectric infrared sensor is basically intended for detecting changes in infrared radiation, if it is to be used for the detection of a stationary infrared radiation source, provisions must be made by some method so that the infrared light is incident intermittently on the light sensitive area of the sensor. Usually, the intermittent interruption (chopping) of the infrared light is accomplished by rotating a chopper constructed with a slitted disk or plate.

Thermopile type, which detects a thermal electromotive force developed between metals, is another type of thermal type infrared sensor. Since the thermopile type sensor utilizes a thermal electromotive force generated by a temperature difference between hot and cold junctions, the device construction is large. Bolometer type is one that detects a change in resistivity, but with this type of sensor, the rate of change of resistivity is not sufficiently large. Dielectric bolometer type is also one type of thermal type infrared sensor. This type of sensor detects the change in permittivity in relation to the temperature change but is not yet ready for practical use. These types of sensors do not need a chopper but need the application of a voltage.

FIG. 17 is a schematic diagram showing a cross sectional structure of a pyroelectric element in a prior art pyroelectric infrared sensor. In the illustrated pyroelectric infrared sensor, light-receiving electrodes 162 for receiving infrared radiation and compensation electrodes 163, one for each of the light-receiving electrodes 162, are formed on the upper surface of a dielectric film 161 which also serves as the substrate, and first counter electrodes 164 and second counter electrodes 165 are formed on the lower surface of the dielectric film 161 in such a manner as to oppose the light-receiving electrodes 162 and compensation electrodes 163, respectively, formed on the upper surface. Output connection patterns 166 and 167 are connected to the light-receiving electrodes 162 and compensation electrodes 163, respectively. The first counter electrode 164 and second counter electrode 165 opposing one pair of light-receiving and compensation electrodes 162 and 163 are electrically interconnected, though not shown explicitly in the figure. With infrared radiation falling only on the light-receiving electrode 162 on the upper surface of the dielectric film 161, a potential difference occurs, and by detecting the resulting voltage, an infrared radiation source can be detected. In this arrangement, since the potential difference is relative to the compensation electrode, variations between sensing elements can be reduced, but cannot be eliminated completely, and sensitivity variations of about 10% occur.

On the other hand, with sensors that do not have compensation electrodes such as described above, since the characteristics of the dielectric film are reflected directly in the output, large variations in sensitivity can occur. In some sensors, corrections are done in software.

Thermal type infrared sensors that detect infrared radiation as described above are capable of detecting a heat radiation source by examining the temperature distribution in a space to be measured. In the prior art sensor, which, for example, is configured to form eight independent detection zones using eight infrared light receiving electrodes 162, when infrared radiation from a human body as an infrared radiation source is incident only on one receiving electrode 162, normally an output signal should be produced only from that one light-receiving electrode 162. As it is, however, the heat of the infrared radiation received by that one infrared receiving electrode 162 is conducted through the dielectric film 161 to other infrared light receiving electrodes 162, causing a temperature rise in those other electrodes and producing the same polarization as if infrared radiation were received by them; as a result, a potential difference also occurs here and is output as an output signal. The problem of thermal crosstalk thus occurs.

This thermal crosstalk, causing other electrodes to produce output signals by heat conduction when infrared radiation is not incident on them, increases an apparent output, blurs the infrared image, and leads to erroneously judging that the heat radiation source is larger than it actually is. The resulting problem is that the position of the heat radiation source cannot be detected accurately. The above description has dealt with the thermal crosstalk between the light-receiving electrodes, but thermal crosstalk from the light-receiving electrode to its associated compensation electrode can likewise occur, causing the problem of degraded reliability of the compensation electrode which should normally work to compensate the output of the receiving electrode without being affected by the infrared radiation.

To suppress the crosstalk, and to prevent infrared light from falling upon the compensation electrode, one possible approach would be to dispose each compensation electrode sufficiently spaced apart from its associated light-receiving electrode, but this would in turn present a problem in terms of device size reduction. A further problem is that, since the compensation electrodes are arranged alongside their associated light-receiving electrodes, the device further increases in size and the construction does not lend itself to device miniaturization and two-dimensional device design.

That is, the whole problem of the thermal crosstalk, which involves heat conduction between the light-receiving electrodes or between the light-receiving and compensation electrodes, is that when infrared radiation is incident on a given light-receiving electrode, outputs are also produced from its neighboring electrodes, causing variations and errors in the output of space sensing and making it impossible to accurately detect the heat radiating object. A further problem is that if the crosstalk is to be suppressed sufficiently, the device size necessarily increases, posing a barrier to achieving higher resolution and device miniaturization.

Furthermore, with the provision of the compensation electrodes, since the sensor output can be detected as the potential difference between a light-receiving electrode and its associated compensation electrode, variations in the characteristics of the dielectric film itself can be offset to some degree, and sensitivity variations between sensing elements can be suppressed to a certain extent; however, there remains the problem that the sensitivity variations cannot be suppressed sufficiently and sensitivity variations of 10% or greater occur.

On the other hand, sensors without compensation electrodes have the problem that large sensitivity variations can occur between sensing elements because the characteristics of the dielectric film are reflected directly in the output. In some sensors, corrections to sensitivity are done in software on a pixel by pixel basis, but the problem is that this involves an extremely complicated process.

More specifically, the problem is that as the number of infrared sensing elements increases, the difference in the characteristics of the dielectric film becomes more pronounced, and sensitivity variations between sensing elements become very large, causing variations and errors in the output of space sensing and making it impossible to accurately detect the heat radiating object. If the variations are to be suppressed, then complicated procedures using software become necessary, posing a barrier to achieving higher resolution and lower cost construction.

In view of the above-outlined problems with the prior art thermal type infrared sensing devices, it is an object of the present invention to provide a low-cost thermal type infrared sensing device and a fabrication method for the same, wherein the device size is reduced to achieve the miniaturization and the two-dimensional, high-resolution design of the device construction. It is also an object of the present invention to provide a low-cost thermal type infrared sensing device and a fabrication method for the same, wherein in addition to reducing the device size, the light-receiving electrodes and compensation electrodes are formed in such a manner as to suppress thermal crosstalk, thereby preventing the blurring of infrared images and achieving the miniaturization and the two-dimensional, high-resolution design of the device construction. It is a further object of the present invention to provide an infrared imaging system that can suppress sensitivity variations among light-receiving electrodes, is capable of accurate and substantially error-free sensing of a space to be measured, and achieves high resolution. It is a still further object of the present invention to provide an infrared imaging apparatus equipped with the above thermal type infrared sensing device or infrared imaging system.

A thermal type infrared sensing device of the present invention comprises: a plurality of light-receiving electrodes for outputting a change of surface charge associated with a polarization that occurs in a dielectric when subjected to infrared radiation; and a single compensation electrode for compensating the output of each of said light-receiving electrodes.

A method of the present invention for fabricating a thermal type infrared sensing device, comprises the steps of: forming a compensation electrode on a substrate; forming a second dielectric member on top of said compensation electrode; forming a second counter electrode on top of said second dielectric member; forming a first counter electrode on top of said second counter electrode; forming a first dielectric member on top of said first counter electrode; and forming a light-receiving electrode on top of said first dielectric member.

Figure 1:
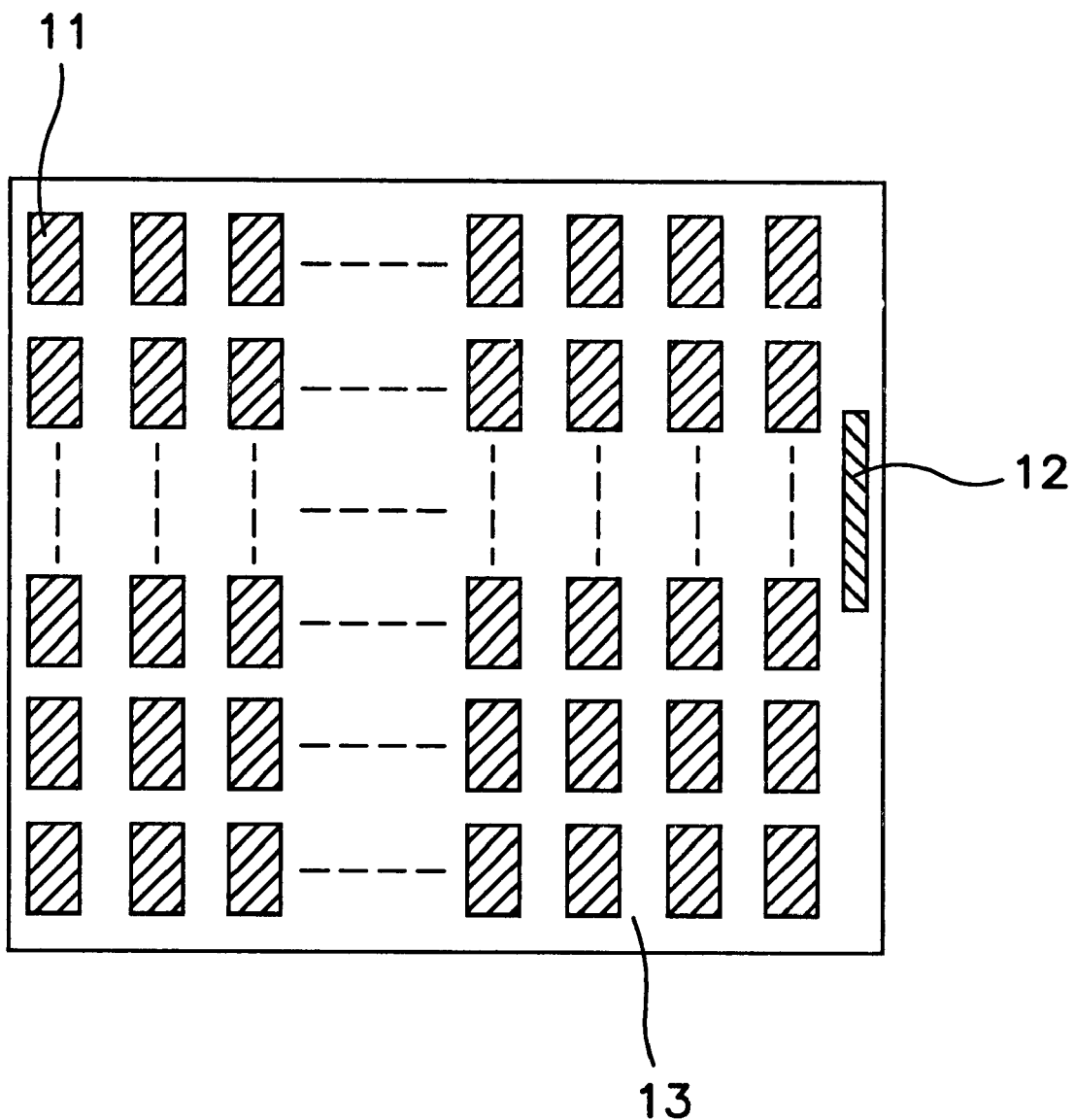
FIG. 1 is a schematic diagram showing the surface configuration of a thermal type infrared sensing device according to a first embodiment of the present invention.

DESCRIPTION OF THE REFERENCE NUMERALS 11, 21, 31, 48, 201 . . . LIGHT-RECEIVING ELECTRODE
12, 22, 32, 44, 202 . . . COMPENSATION ELECTRODE
13, 23, 24, 33, 34, 41 . . . SEMICONDUCTOR SUBSTRATE
42 . . . CAVITY
43, 49 . . . INSULATING FILM
45, 47 . . . DIELECTRIC FILM
46 . . . COUNTER ELECTRODE
44a, 48a . . . CONNECTION PATTERN
203 . . . READING BLOCK
204 . . . DISTANCE CORRECTION BLOCK
205 . . . DIFFERENCE DETECTION BLOCK
206 . . . AMPLIFYING BLOCK
207 . . . A/D CONVERSION BLOCK

PREFERRED EMBODIMENTS OF THE INVENTION

Embodiments of the present invention will be described below with reference to the accompanying drawings.

Embodiment 1

FIG. 1 is a schematic diagram showing the surface configuration of a thermal type infrared sensing device according to a first embodiment of the present invention.

A dielectric film (not shown) in which a polarization occurs when subjected to infrared radiation is formed on a silicon semiconductor substrate 13, and a plurality of light-receiving electrodes 11 for receiving infrared radiation and a plurality of first counter electrodes (not shown) opposing the respective light-receiving electrodes are respectively formed on the upper and lower surfaces of the dielectric film in such a manner as to sandwich the dielectric film therebetween. For these light-receiving electrodes 11, one compensation electrode 12 and a second counter electrode (not shown) opposing it across the dielectric film are formed near the outer periphery of the same semiconductor substrate 13 that contains the light-receiving electrodes 13. Each of the first counter electrodes is electrically connected to the second counter electrode.

In the above arrangement, when infrared radiation is incident on a given light-receiving electrode 11, the output of the light-receiving electrode 11 is compensated by an output from the compensation electrode 12.

That is, by providing only one compensation electrode for the plurality of light-receiving electrodes, the thermal type infrared sensing device of the present embodiment solves the problem of increased device construction associated with the prior art one-dimensional pyroelectric array type infrared thermal sensing device having one compensation electrode for each light-receiving electrode. Accordingly, the construction can be made compact in size, facilitating the two-dimensional design of the device construction.

Furthermore, by forming the light-receiving electrodes and the compensation electrode on the same dielectric film, it becomes possible to suppress the sensitivity variations between light-receiving electrodes resulting from variations in the characteristics of the dielectric film itself; as a result, an accurate high-resolution infrared image and an accurate two-dimensional temperature distribution can be obtained.

In the present embodiment, the dielectric member of the present invention has been described as being a single dielectric film formed on one substrate, but if it is divided into a plurality of separate segments one for each light-receiving electrode and one for the compensation electrode, the effect of being able to suppress the thermal crosstalk occurring via the dielectric material can be realized in addition to the above effect of being able to make the construction compact and facilitate the two-dimensional design.

Embodiment 2

Next, a second embodiment of the present invention will be described with reference to drawing.

Figure 2:
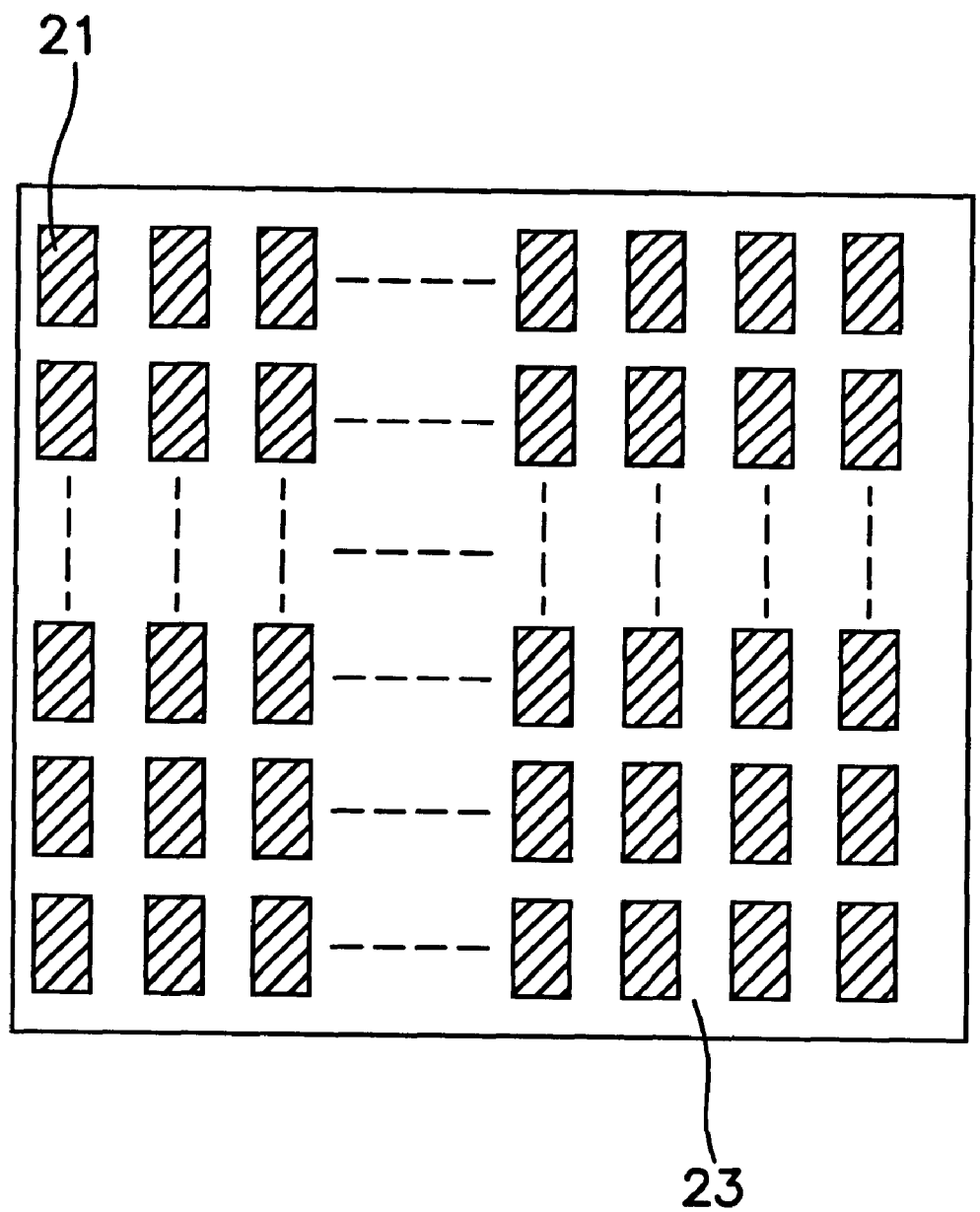
FIG. 2 is a schematic diagram showing the surface configuration of a thermal type infrared sensing device according to a second embodiment of the present invention.
Figure 2:
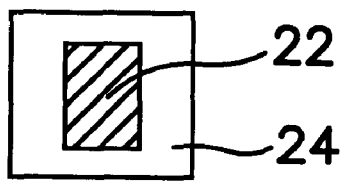

FIG. 2 is a schematic diagram illustrating the surface configuration of a thermal type infrared sensing device according to the second embodiment of the present invention.

A dielectric film (not shown) in which a polarization occurs when subjected to infrared radiation is formed on a silicon semiconductor substrate 23, and a plurality of light-receiving electrodes 21 for receiving infrared radiation and a plurality of first counter electrodes (not shown) opposing the respective light-receiving electrodes are respectively formed on the upper and lower surfaces of the dielectric film in such a manner as to sandwich the dielectric film therebetween. Further, a second dielectric film (not shown) of the same material and thickness as the first dielectric film is formed on a second silicon semiconductor substrate 24, and one compensation electrode 22 and a second counter electrode (not shown) opposing it across the second dielectric film are respectively formed on the upper and lower surfaces of the second dielectric film. Each of the first counter electrodes is electrically connected to the second counter electrode.

In the above arrangement, when infrared radiation is incident on a given light-receiving electrode 21, the output of the light-receiving electrode 21 is compensated by an output from the compensation electrode 22.

That is, by providing only one compensation electrode for the plurality of light-receiving electrodes, the thermal type infrared sensing device of the present embodiment solves the problem of increased device construction associated with the prior art one-dimensional pyroelectric array type infrared thermal sensing device having one compensation electrode for each light-receiving electrode. Accordingly, the construction can be made compact in size, facilitating the two-dimensional design of the device construction. Furthermore, by forming the light-receiving electrodes and the compensation electrode on different substrates, it becomes possible to prevent heat conduction from the light-receiving electrodes to the compensation electrode and to obtain an accurate high-resolution infrared image free from crosstalk; as a result, an accurate two-dimensional temperature distribution can be obtained for accurate detection of a heat source.

In the present embodiment, by overlaying the substrate 23 and the semiconductor substrate 24 containing the compensation electrode 22 one on top of the other in such a manner as not to interfere with the infrared radiation incident on the light-receiving electrodes 21, the device size can be further reduced two-dimensionally.

In the present embodiment, the dielectric member of the present invention has been described as being formed as a single dielectric film for the plurality of light-receiving electrodes, but if it is divided into a plurality of separate segments one for each light-receiving electrode, the effect of being able to suppress the thermal crosstalk occurring between the light-receiving electrodes via the dielectric material can be realized in addition to the above described effects.

Embodiment 3

Next, a third embodiment of the present invention will be described with reference to drawing.

Figure 3:
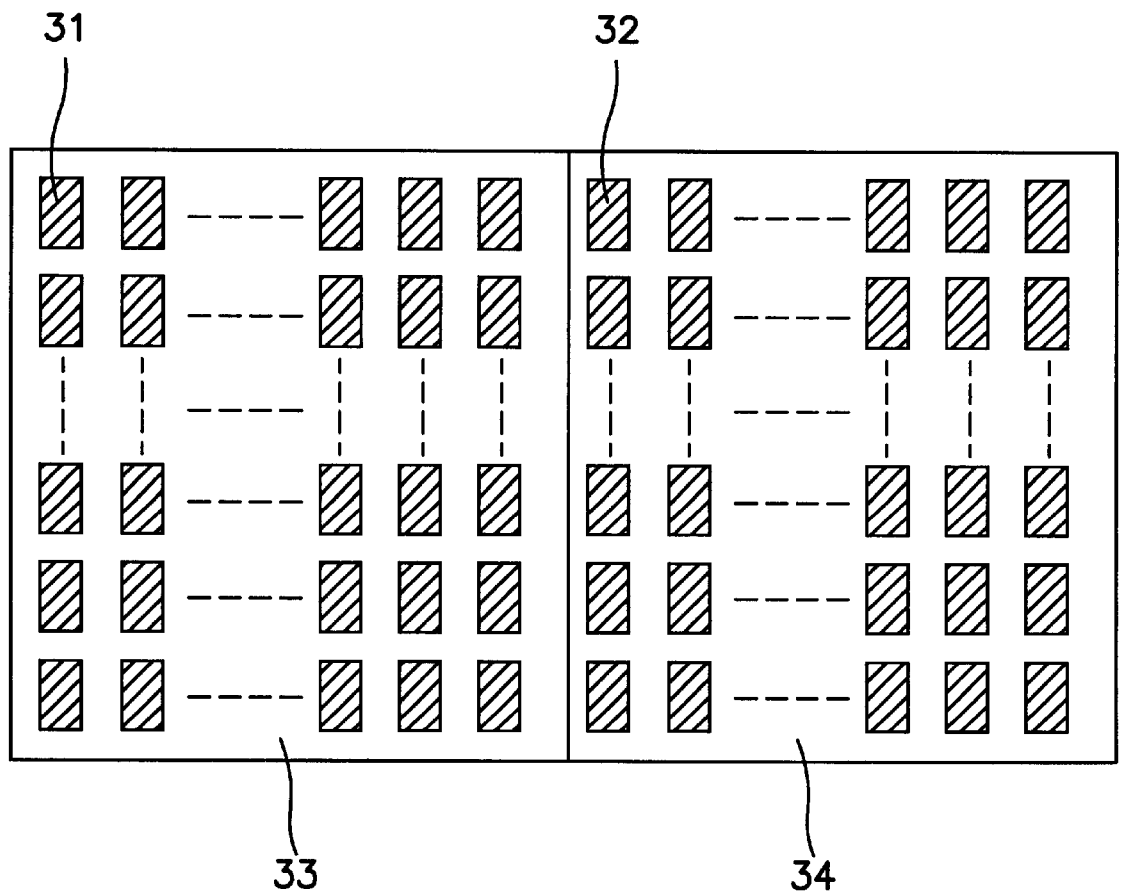
FIG. 3 is a schematic diagram showing the surface configuration of a thermal type infrared sensing device according to a third embodiment of the present invention.

FIG. 3 is a schematic diagram illustrating the surface configuration of a thermal type infrared sensing device according to the third embodiment of the present invention.

A dielectric film (not shown) in which a polarization occurs when subjected to infrared radiation is formed on a silicon semiconductor substrate 33, and a plurality of light-receiving electrodes 31 for receiving infrared radiation and a plurality of first counter electrodes (not shown) opposing the respective light-receiving electrodes are respectively formed on the upper and lower surfaces of the dielectric film in such a manner as to sandwich the dielectric film therebetween. Further, a second dielectric film (not shown) of the same material and thickness as the first dielectric film is formed on a second silicon semiconductor substrate 34, and a plurality of compensation electrodes 32 corresponding one for one to the light-receiving electrodes 31 and a plurality of second counter electrodes (not shown) opposing the respective compensation electrodes are respectively formed on the upper and lower surfaces of the second dielectric film in such a manner as to sandwich the second dielectric film therebetween. The first counter electrodes are electrically connected to their associated second counter electrodes.

In the above arrangement, when infrared radiation is incident on a given light-receiving electrode 31, the output of the light-receiving electrode 31 is compensated by an output from its associated compensation electrode 32.

That is, in the thermal type infrared sensing device of the present embodiment, by forming the light-receiving electrodes and the compensation electrodes on different substrates, it becomes possible to prevent heat conduction from the light-receiving electrodes to the compensation electrodes and to obtain an accurate high-resolution infrared image free from crosstalk; as a result, an accurate two-dimensional temperature distribution can be obtained for accurate detection of a heat source.

Furthermore, in the present embodiment, by overlaying the substrate 33 and the semiconductor substrate 34 containing the compensation electrodes 32 one on top of the other in such a manner as not to interfere with the infrared radiation incident on the light-receiving electrodes 31, the device size can be reduced two-dimensionally.

In the present embodiment, the dielectric member of the present invention has been described as being formed as a single dielectric film for the plurality of light-receiving electrodes, but if it is divided into a plurality of separate segments one for each light-receiving electrode, the effect of being able to suppress the thermal crosstalk occurring between the light-receiving electrodes via the dielectric material can be realized in addition to the above described effects.

Embodiment 4

Next, a fourth embodiment of the present invention will be described with reference to drawing.

Figure 4:
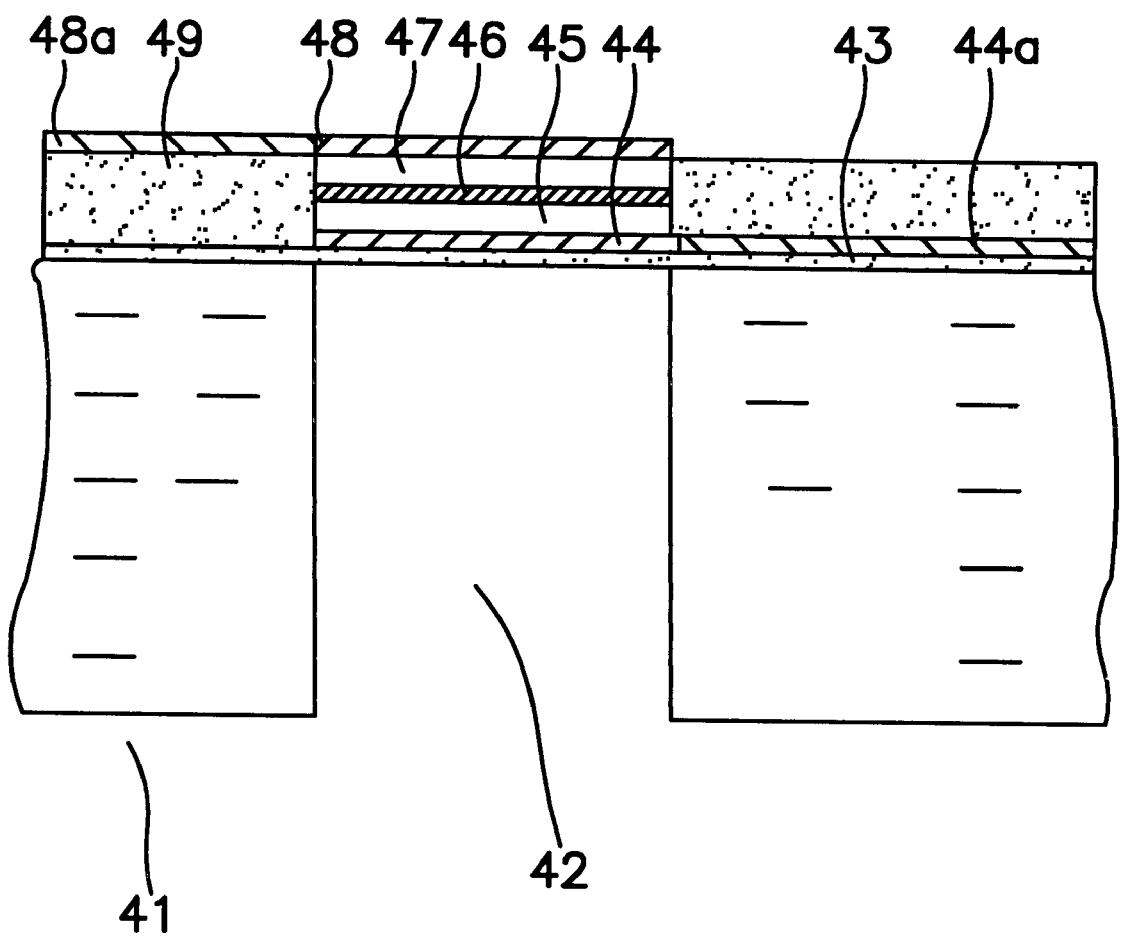
FIG. 4 is a schematic cross sectional view of a sensing element in a thermal type infrared sensing device according to a fourth embodiment of the present invention.

FIG. 4 is a schematic cross sectional view of a sensing element in a thermal type infrared sensing device according to a fourth embodiment of the present invention.

An insulating film 43 is formed over a silicon semiconductor substrate 41 having a cavity 42 formed therein, and a compensation electrode 44, a dielectric film 45 in which a polarization occurs when subjected to infrared radiation, a counter electrode 46, a dielectric film 47 of the same material, thickness, and area as the dielectric film 45, and a light-receiving electrode 48 are formed in this order one on top of another on the portion of the insulating film 43 that lies above the cavity 42. On the silicon semiconductor substrate 41, except the portion above the cavity 42, is formed a second insulating film 49 interposing between the light-receiving electrode 48 and the compensation electrode 44 or the insulating film 43. The insulating film 49 need not necessarily be formed of the same material as the insulating film 43, but if it is to be formed of the same material, the insulating film 49 may be formed integrally with the insulating film 43. Each sensing element of the thermal type infrared sensing device of the present embodiment is formed in the manner described above. The thermal type infrared sensing device of the present embodiment is constructed by forming a plurality of cavities 42 in a two-dimensional arrangement in the silicon semiconductor substrate 41 and by forming one sensing element above each cavity 42 (the entire construction is not shown here). The light-receiving electrode 48 and the compensation electrode 44 are brought out of the sensing element via respective output connection patterns 48a and 44a for connection to external electrodes (not shown). The counter electrode 46 corresponds to the common counter electrode of the present invention, and forms the light-receiving electrode pair of the present invention together with the light-receiving electrode 48 and the compensation electrode pair of the present invention together with the compensation electrode 44. The cavity 42 corresponds to the substrate cavity of the present invention, the dielectric film 47 corresponds to the first dielectric member of the present invention, and the dielectric film 45 corresponds to the second dielectric member of the present invention.

Further, the construction is such that infrared radiation from above is allowed to enter the dielectric film 47 but not allowed to enter the dielectric film 45. For example, the light-receiving electrode 48 is made of a material that transmits infrared radiation, and the counter electrode 46 of a material that blocks the infrared radiation.

In the above arrangement, when infrared radiation is incident on the light-receiving electrode 48, the output of the light-receiving electrode 48 is compensated by an output from its associated compensation electrode 44. The absorbed heat of incident infrared radiation is dissipated into the air through the cavity 42, thus suppressing the thermal crosstalk to other light-receiving electrode pairs occurring through the semiconductor substrate 41.

Next, a fabrication method will be described for the thermal type infrared sensing device of the present embodiment. The thermal type infrared sensing device of the present embodiment is constructed with a two-dimensional arrangement of a plurality of sensing elements on the semiconductor substrate 41, as described above, and the plurality of sensing elements are formed simultaneously within the same fabrication process. However, the following description of the fabrication method is given focusing on one sensing element.

FIGS. 5(a) through 5(d) are schematic cross sectional views of one sensing element for explaining the fabrication method for the thermal type infrared sensing device of the present embodiment.

Figure 5A:
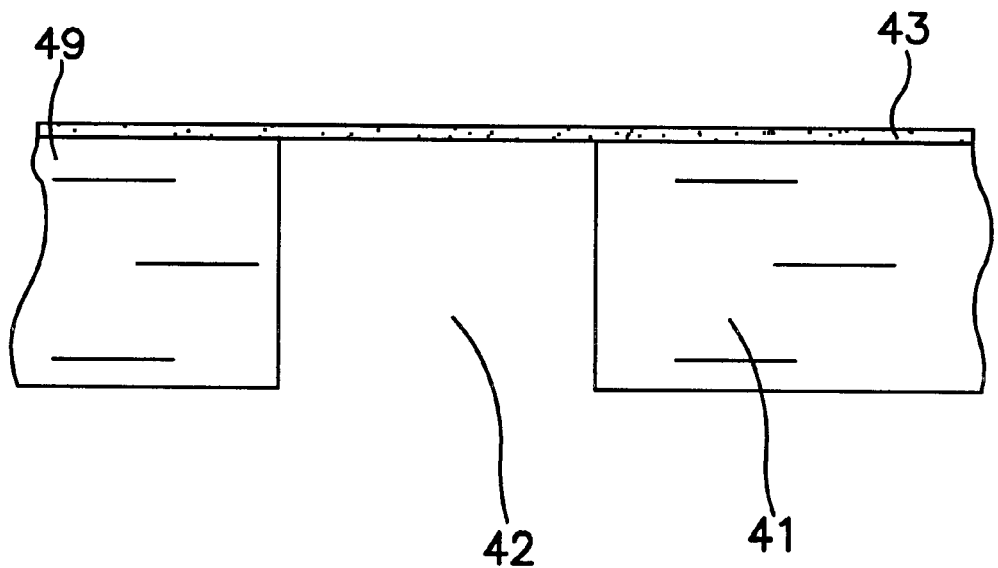
FIGS. 5(a) through 5(d) show in schematic cross sectional view four stages in the manufacturing process of one sensing element for explaining a fabrication method for the thermal type infrared sensing device of the fourth embodiment of the present invention.
Figure 5B:
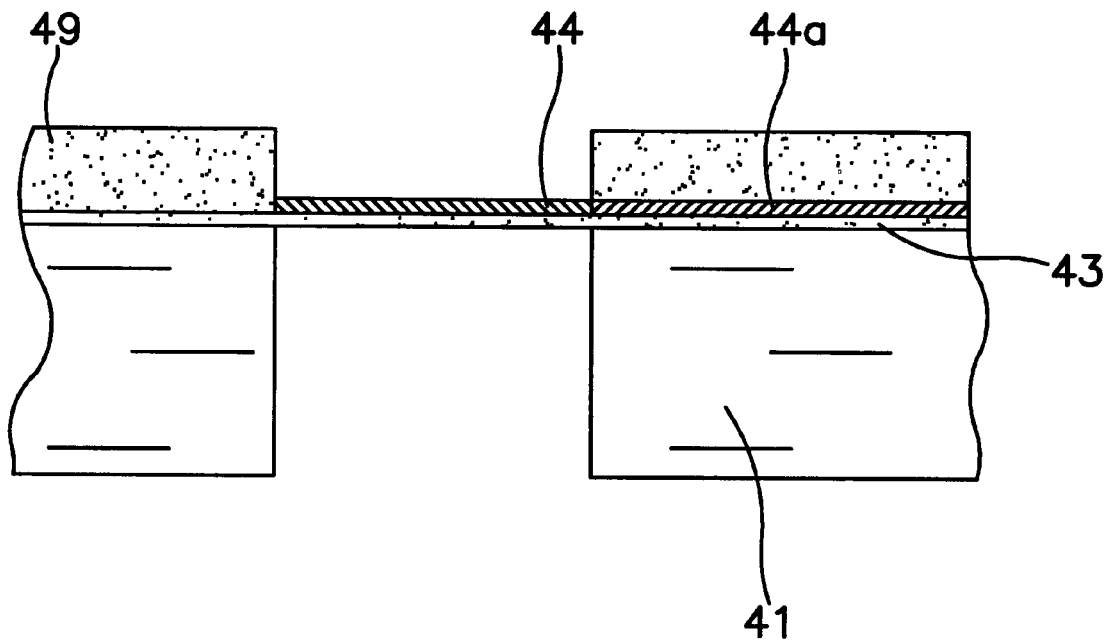
Figure 5C:
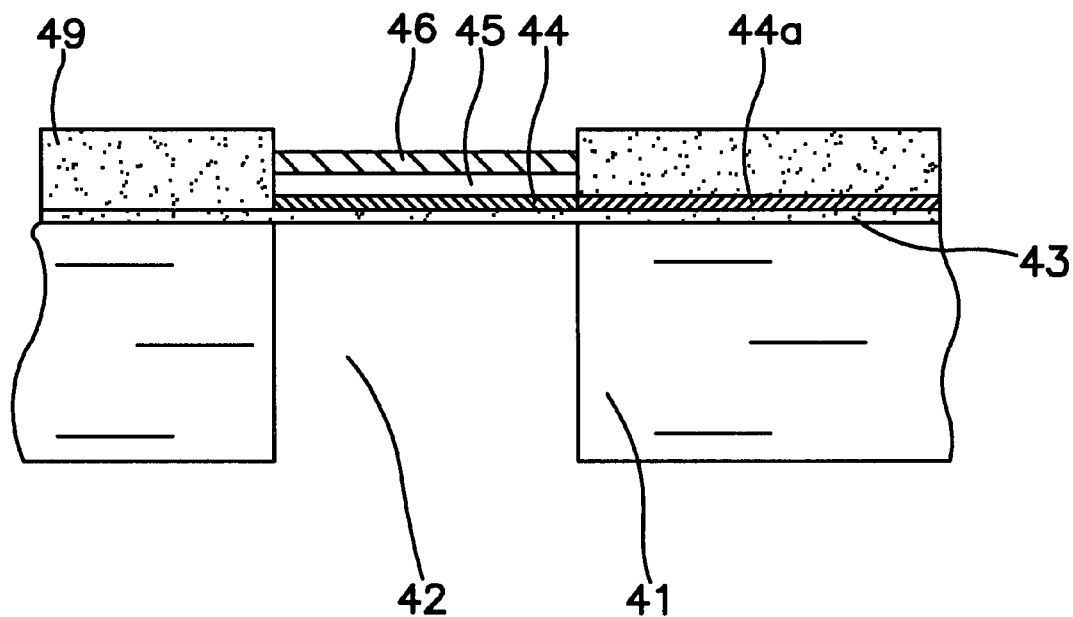
Figure 5D:
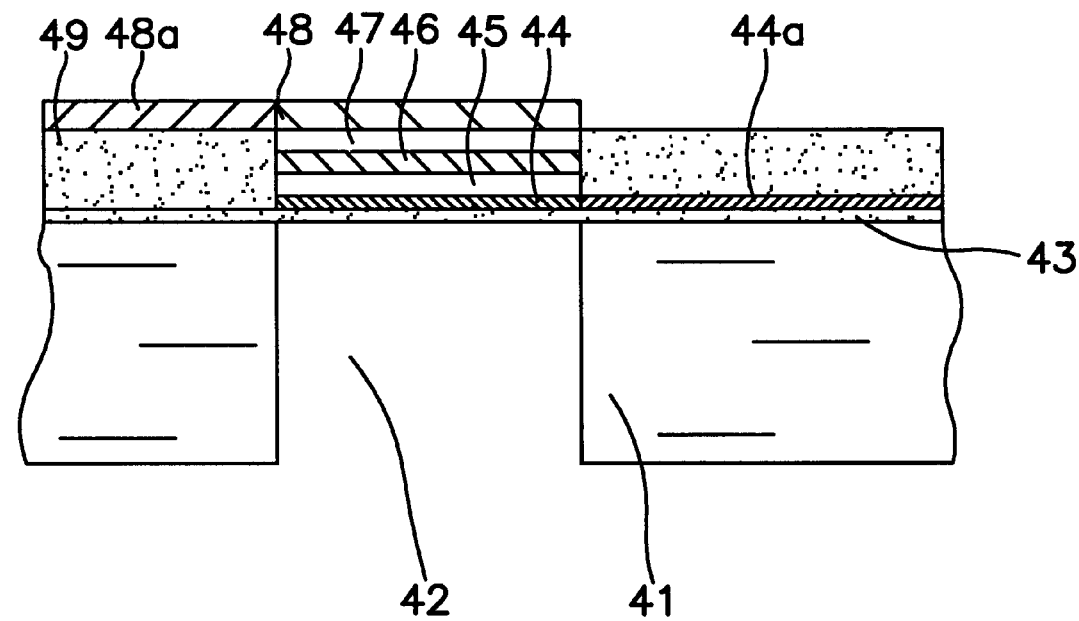

First, the cavity 42 is formed in the silicon semiconductor substrate 41, and the insulating film 43 is formed over the semiconductor substrate 41 (FIG. 5(a)). Next, the compensation electrode 44 and the connection pattern 44a connecting to it are formed on top of the insulating film 43, and the insulating film 49 is formed on the connection pattern 44a or the insulating film 43, except the portion above the cavity 42 (FIG. 5(b)). Next, the dielectric film 45 in which a polarization occurs when subjected to infrared radiation is formed on the compensation electrode 44 above the cavity 42, and the counter electrode 46 is formed on top of the dielectric film 45 (FIG. 5(c)). Further, the dielectric film 47 of the same material, thickness, and area as the dielectric film 45 is formed on top of the counter electrode 46, after which the light-receiving electrode 48 is formed on the dielectric film 47 and the connection pattern 48a connecting to the light-receiving electrode 48 is formed on a portion of the insulating film 49 (FIG. 5(d)). With the above process, each sensing element of the thermal type infrared sensing device of the present embodiment is formed. By forming such sensing elements in a two-dimensional arrangement on the silicon semiconductor substrate 41, the thermal type infrared sensing device of the present embodiment is fabricated.

That is, in the thermal type infrared sensing device of the present embodiment, for each light-receiving electrode pair provided to receive infrared radiation there is formed one compensation electrode pair on the back surface of the substrate of the light-receiving electrode pair. Accordingly, the construction can be made compact in size, facilitating the two-dimensional design of the device construction. Furthermore, by forming one compensation electrode pair underneath each light-receiving electrode pair, it becomes possible to suppress the sensitivity variations between electrode pairs resulting from variations in the characteristics of the dielectric film itself, and to make the electrode area the same between them; furthermore, thermal crosstalk between the light-receiving electrode pairs can be suppressed, the miniaturization and the higher density, higher resolution design of the device construction can be achieved, and an accurate two-dimensional temperature distribution can thus be obtained.

The counter electrode 46 has been described as corresponding to the common counter electrode of the present invention, but as an alternative configuration, the counter electrode may be divided into a first counter electrode and a second counter electrode electrically connected together, the former being associated with the light-receiving electrode 48 and the latter with the compensation electrode 44.

Further, in the present embodiment, the insulating film 43 has been described as being formed over the entire surface of the silicon semiconductor substrate 41, but this is not an essential requirement; for example, the portion of the insulating film that lies above the cavity 42 may be omitted. That is, the only requirement is that the insulating film 43 or 49 be formed to ensure electrical isolation of the electrodes and dielectric films from the silicon semiconductor substrate 41.

In the present embodiment, the electrodes and films have been described as being formed planar as shown in FIG. 4, but they may include a step portion.

Figure 6:
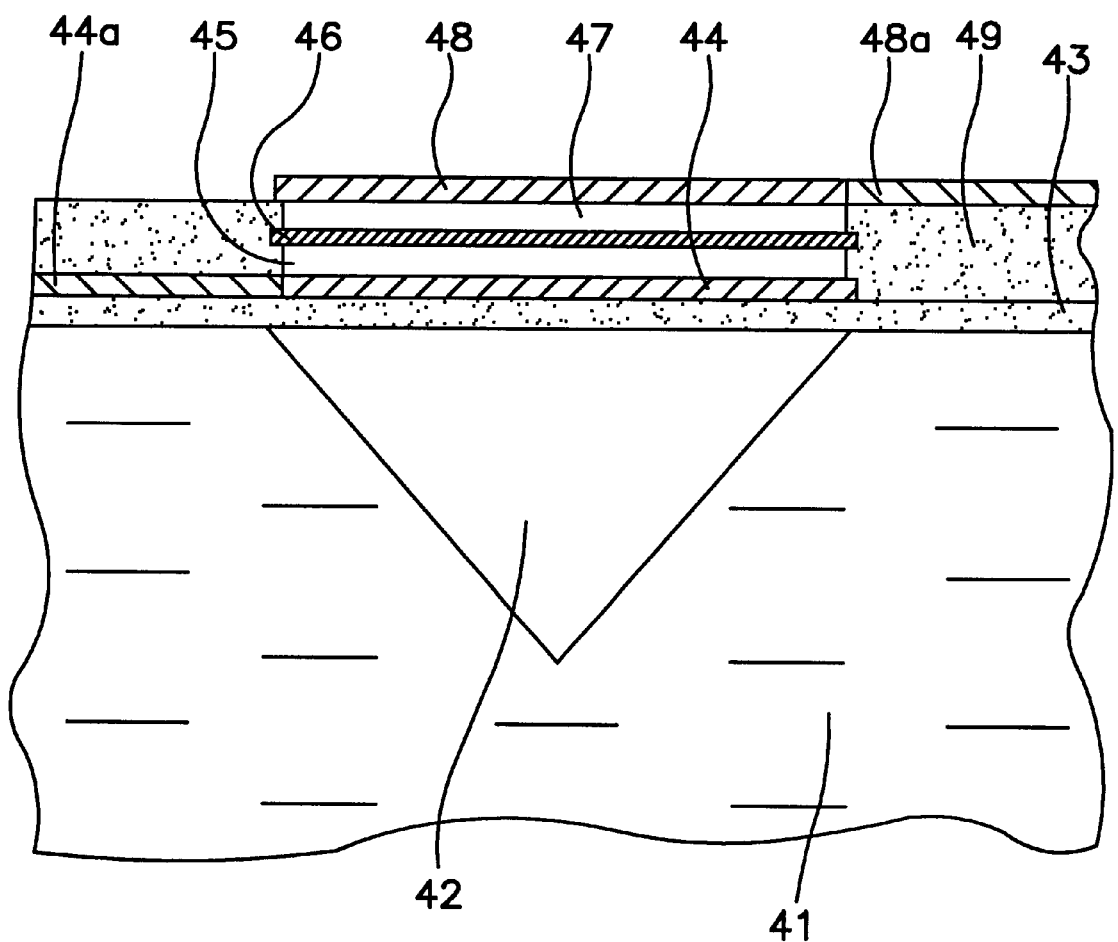
FIG. 6 is a schematic cross sectional view showing a modified example of the sensing element in the thermal type infrared sensing device according to the fourth embodiment of the present invention.

The substrate cavity of the present invention has been described in the present embodiment as being formed passing through the substrate, but the cavity may be formed as a hollow space not passing through the substrate, as shown in the modified example of FIG. 6. That is, the shape and other features of the substrate cavity are not specifically limited, the only requirement being that the cavity be formed in such a shape that allows the heat of incident infrared radiation absorbed by the first dielectric member of the present invention to be dissipated through the cavity.

Furthermore, the substrate cavity of the present invention has been described in the present embodiment as being formed only in the region directly below the overlapping portion of the first and second dielectric members of the present invention, but the cavity may be formed in a wider region including the region directly below the overlapping portion. More specifically, the only requirement is that the cavity be formed at least in the region directly below the portion where the first dielectric member overlaps the light-receiving electrode pair.

In the present embodiment, the first and second dielectric members of the present invention have been described as being formed for each sensing element, but they may be formed as single continuous dielectric films extending across a plurality of sensing elements. In this case, however, the effect of suppressing the thermal crosstalk between the light-receiving electrode pairs is reduced compared with the structure of the present invention.

Furthermore, the step of forming the substrate cavity of the present invention has been described in the present embodiment as being performed prior to the step of forming the compensation electrode of the present invention, but the order is not restricted to the illustrated example; for example, the cavity formation step may be performed following the light-receiving electrode formation step.

Embodiment 5

Next, a fifth embodiment of the present invention will be described with reference to drawing.

Figure 7:
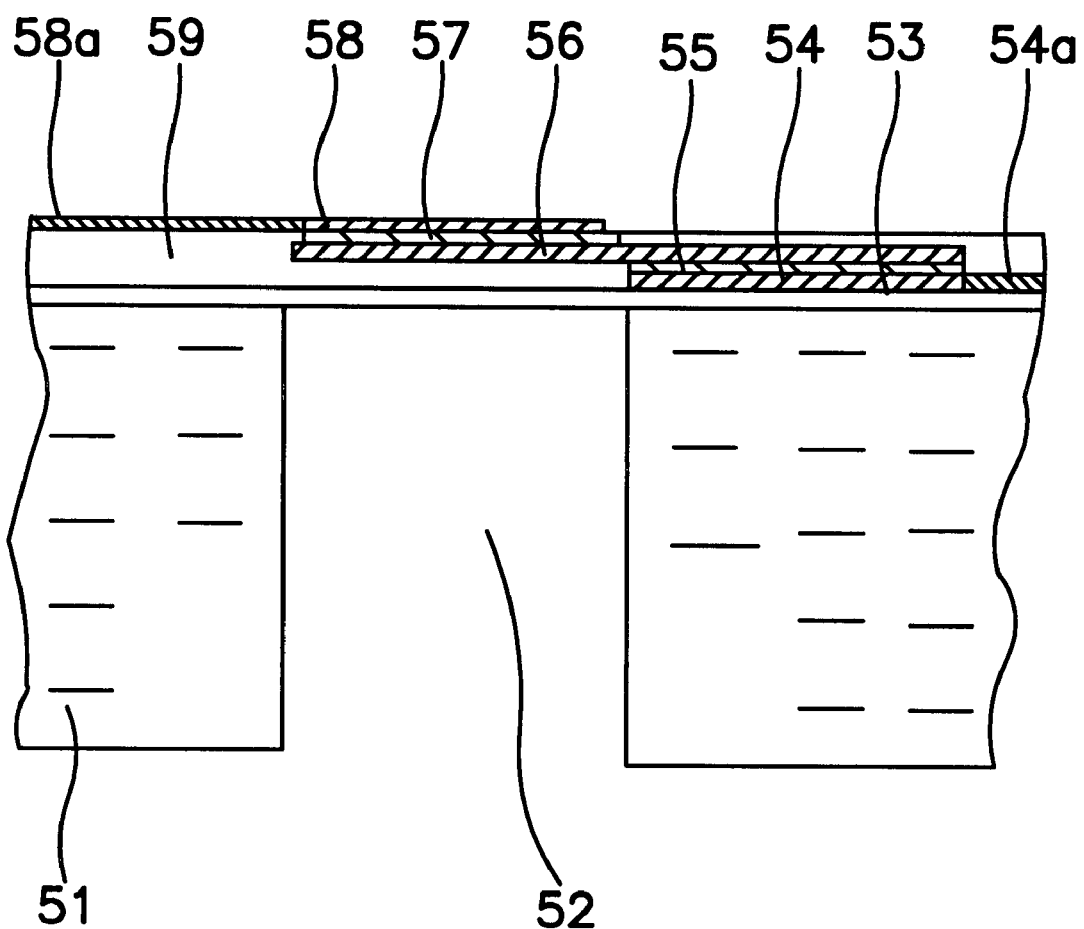
FIG. 7 is a schematic cross sectional view of a sensing element in a thermal type infrared sensing device according to a fifth embodiment of the present invention.

FIG. 7 is a schematic cross sectional view of one sensing element in a thermal type infrared sensing device according to the fifth embodiment of the present invention. The thermal type infrared sensing device of this embodiment is identical in structure to the thermal type infrared sensing device of the foregoing fourth embodiment, except that the first dielectric member and its associated second dielectric member are formed in two-dimensionally different positions. Accordingly, the structure of this embodiment is assumed to be the same as that of the fourth embodiment, except where specifically noted, and the constituent members having the same names as those in the fourth embodiment are assumed to have the same functions as those in the fourth embodiment, unless specifically noted otherwise.

An insulating film 53 is formed over a silicon semiconductor substrate 51, and a compensation electrode 54 and a dielectric film 55, in which a polarization occurs when subjected to infrared radiation, are formed one on top of the other on the portion of the insulating film 53 that lies near an edge of a cavity 52 formed in the silicon semiconductor substrate 51. An insulating film 59 is formed on the insulating film 53 above the cavity 52, and a counter electrode 56 is formed over the insulating film 59 above the cavity 52 and the dielectric film 55. Further, a dielectric film 57 of the same material, thickness, and area as the dielectric film 55 is formed on the portion of the counter electrode 56 that lies above the cavity 52, and a light-receiving electrode 58 is formed in such a manner as to cover at least the upper surface of the dielectric film 57. In other portions than the portion above the cavity 52 of the silicon semiconductor substrate 51, the insulating film 59 is also formed between the light-receiving electrode 58 and the compensation electrode 54 or the insulating film 53. One sensing element of the thermal type infrared sensing device of the present embodiment is formed in the manner described above. The thermal type infrared sensing device of the present embodiment is constructed by forming a plurality of cavities 52 in a two-dimensional arrangement in the silicon semiconductor substrate 51 and by forming one sensing element for each cavity 52 (the entire construction is not shown here). The light-receiving electrode 58 and the compensation electrode 54 are brought out of the sensing element via respective output connection patterns 58a and 54a for connection to external electrodes (not shown).

Further, the construction is such that infrared radiation from above is allowed to enter the dielectric film 57 but not allowed to enter the dielectric film 55. For example, the light-receiving electrode 58 is made of a material that transmits infrared radiation, and the counter electrode 56 of a material that blocks the infrared radiation.

In the above arrangement, when infrared radiation is incident on the light-receiving electrode 58, the output of the light-receiving electrode 58 is compensated by an output from its associated compensation electrode 54. The absorbed heat of incident infrared radiation is dissipated into the air through the cavity 52, thus suppressing the thermal crosstalk to other light-receiving electrode pairs occurring through the semiconductor substrate 51.

That is, while the effect of making the construction compact is reduced compared with the fourth embodiment because of increased area per sensing element, the thermal type infrared sensing device of the present embodiment shares the other effects of the fourth embodiment, and offers the additional effect of being able to suppress the thermal crosstalk from the light-receiving electrode pairs to the compensation electrode pairs since the heat of infrared radiation absorbed by the dielectric film 57 can be dissipated into the air without passing through the dielectric film 55.

In the present embodiment, the insulating films 53 and 59 have been described as being formed also in the portion above the cavity 52, but the portions of the films above the cavity 52 may be omitted and the counter electrode 56 may be exposed directly in the cavity 52.

Embodiment 6

Next, a sixth embodiment of the present invention will be described with reference to drawing.

Figure 8:
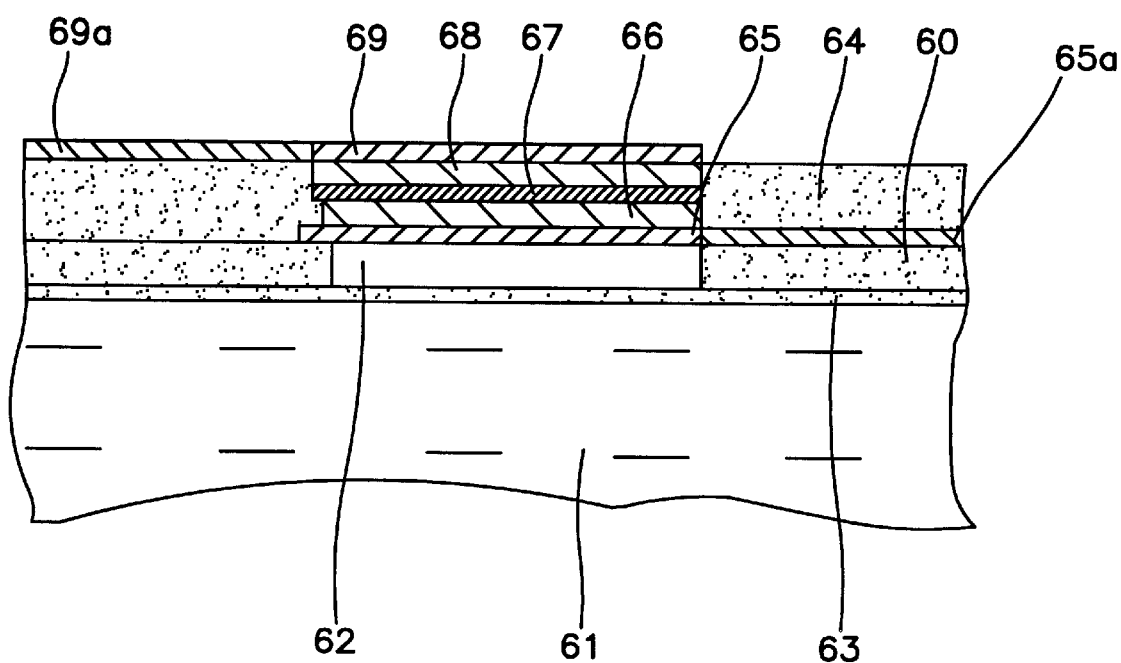
FIG. 8 is a schematic cross sectional view of a sensing element in a thermal type infrared sensing device according to a sixth embodiment of the present invention.

FIG. 8 is a schematic cross sectional view of a sensing element in a thermal type infrared sensing device according to the sixth embodiment of the present invention. The thermal type infrared sensing device of this embodiment is identical in structure to the thermal type infrared sensing device of the fourth embodiment, except that an insulating film cavity is formed instead of the substrate cavity. Accordingly, the structure of this embodiment is assumed to be the same as that of the fourth embodiment, except where specifically noted, and the constituent members having the same names as those in the fourth embodiment are assumed to have the same functions as those in the fourth embodiment, unless specifically noted otherwise.

As shown in FIG. 8, an insulating film 63 is formed over a silicon semiconductor substrate 61, an insulating film 60 having a cavity 62 is formed on top of the insulating film 63, and a compensation electrode 65 is formed on a portion of the insulating film 60 in such a manner as to close the top of the cavity 62. A dielectric film 66 in which a polarization occurs when subjected to infrared radiation, a counter electrode 67, a dielectric film 68 of the same material, thickness, and area as the dielectric film 66, and a light-receiving electrode 69 are formed from the bottom to the top in the order listed on the portion of the compensation electrode 65 that lies directly above the cavity 62. Another insulating film 64 is formed on the insulating film 60, directly or with the compensation electrode 65 interposed therebetween, except the portion above the cavity 62. The insulating films 60, 63, and 64 need not necessarily be formed of the same material, but if they are to be formed of the same material, they may be formed integrally of the same material. One sensing element of the thermal type infrared sensing device of the present embodiment is formed in the manner described above. The thermal type infrared sensing device of the present embodiment is constructed by forming a plurality of cavities 62 in a two-dimensional arrangement in the insulating film 60 on the silicon semiconductor substrate 61 and by forming one sensing element for each cavity 62 (the entire construction is not shown here). The light-receiving electrode 69 and the compensation electrode 65 are brought out of the sensing element via respective output connection patterns 69a and 65a for connection to external electrodes (not shown). The counter electrode 67 corresponds to the common counter electrode of the present invention, and forms the light-receiving electrode pair of the present invention together with the light-receiving electrode 69 and the compensation electrode pair of the present invention together with the compensation electrode 65. The cavity 62 corresponds to the insulating film cavity of the present invention, the dielectric film 68 corresponds to the first dielectric member of the present invention, and the dielectric film 66 corresponds to the second dielectric member of the present invention.

Further, the construction is such that infrared radiation from above is allowed to enter the dielectric film 68 but not allowed to enter the dielectric film 66. For example, the light-receiving electrode 69 is made of a material that transmits infrared radiation, and the counter electrode 67 of a material that blocks the infrared radiation.

In the above arrangement, when infrared radiation is incident on the light-receiving electrode 69, the output of the light-receiving electrode 69 is compensated by an output from its associated compensation electrode 65. The absorbed heat of incident infrared radiation is dissipated into the air through the cavity 62, thus suppressing the thermal crosstalk to other light-receiving electrode pairs occurring through the semiconductor substrate 61 or through the insulating film 60.

That is, in the thermal type infrared sensing device of the present embodiment, for each light-receiving electrode pair provided to receive infrared radiation there is formed one compensation electrode pair on the back surface of the substrate of the light-receiving electrode pair. Accordingly, the construction can be made compact in size, facilitating the two-dimensional design of the device construction. Furthermore, by forming one compensation electrode pair underneath each light-receiving electrode pair, it becomes possible to suppress the sensitivity variations between electrode pairs resulting from variations in the characteristics of the dielectric film itself, and to make the electrode area the same between them; furthermore, thermal crosstalk between the light-receiving electrode pairs can be suppressed, the miniaturization and the higher density, higher resolution design of the device construction can be achieved, and an accurate two-dimensional temperature distribution can thus be obtained.

In the present embodiment, the insulating film 63 has been described as being formed over the entire surface of the silicon semiconductor substrate 61, but this is not an essential requirement; for example, the insulating film 63 may be omitted and the insulating film 60 may be formed directly on the silicon semiconductor substrate 61. That is, the only requirement is that the insulating film 60, 63, or 64 be formed to ensure electrical isolation of the electrodes and dielectric films from the silicon semiconductor substrate 61.

Embodiment 7

Next, a seventh embodiment of the present invention will be described with reference to drawing.

Figure 9:
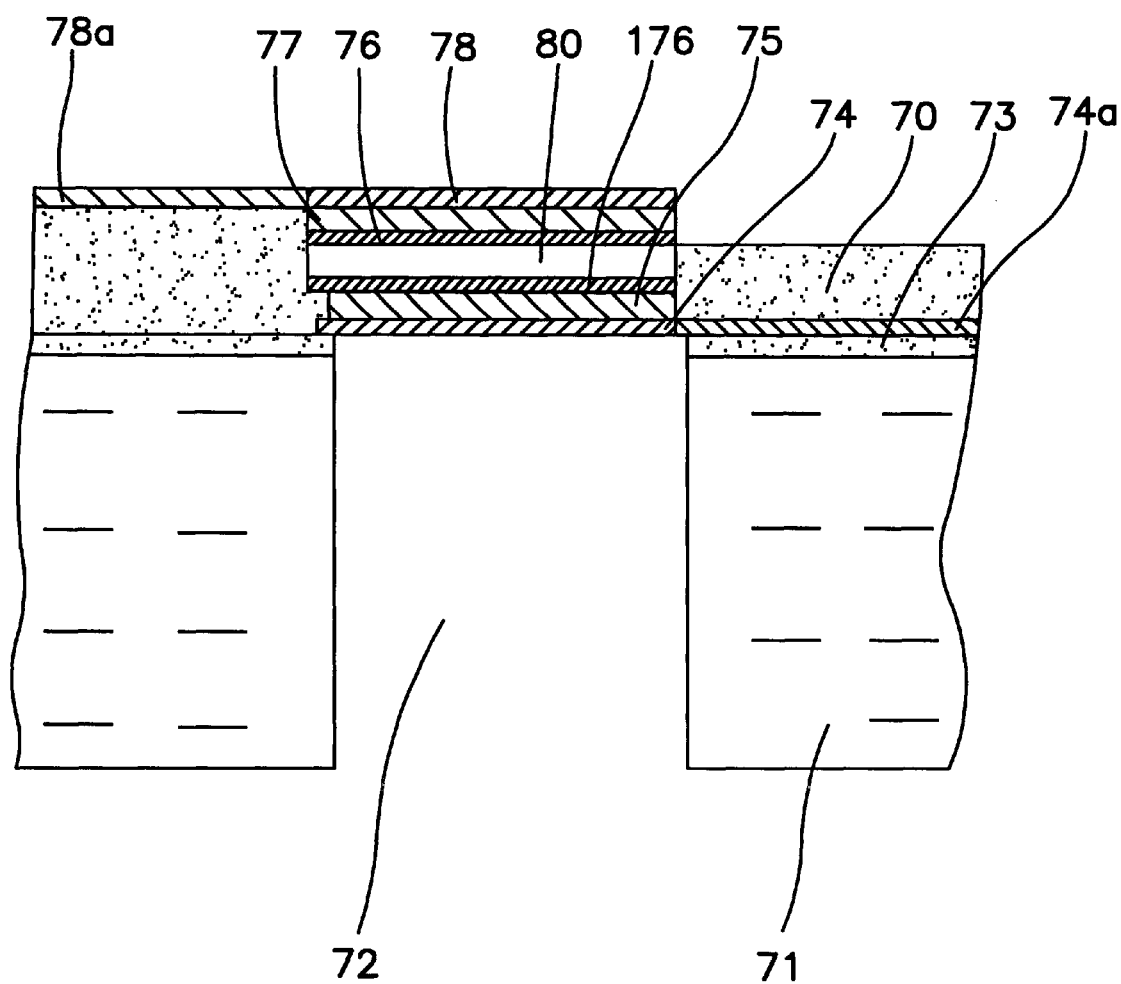
FIG. 9 is a schematic cross sectional view of a sensing element in a thermal type infrared sensing device according to a seventh embodiment of the present invention.
Figure 10A:
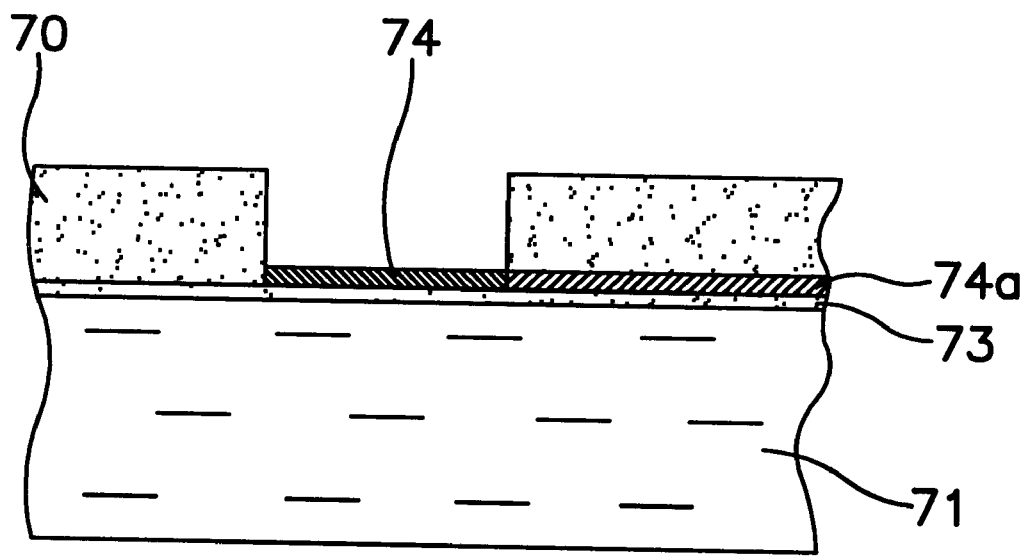
FIGS. 10(a) through 10(d) show in schematic cross sectional view four stages in the manufacturing process of one sensing element for explaining a fabrication method for the thermal type infrared sensing device of the seventh embodiment of the present invention.
Figure 10B:
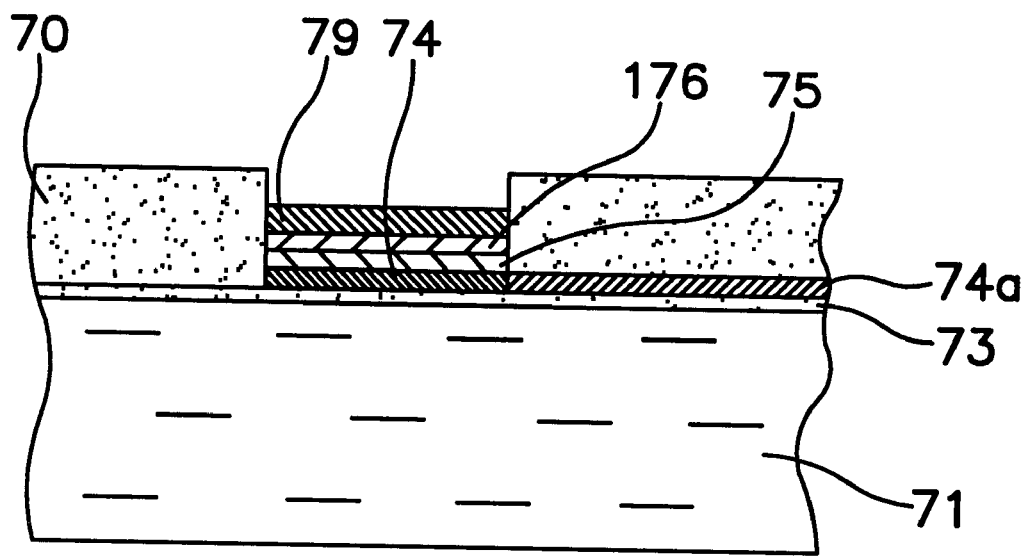
Figure 10C:
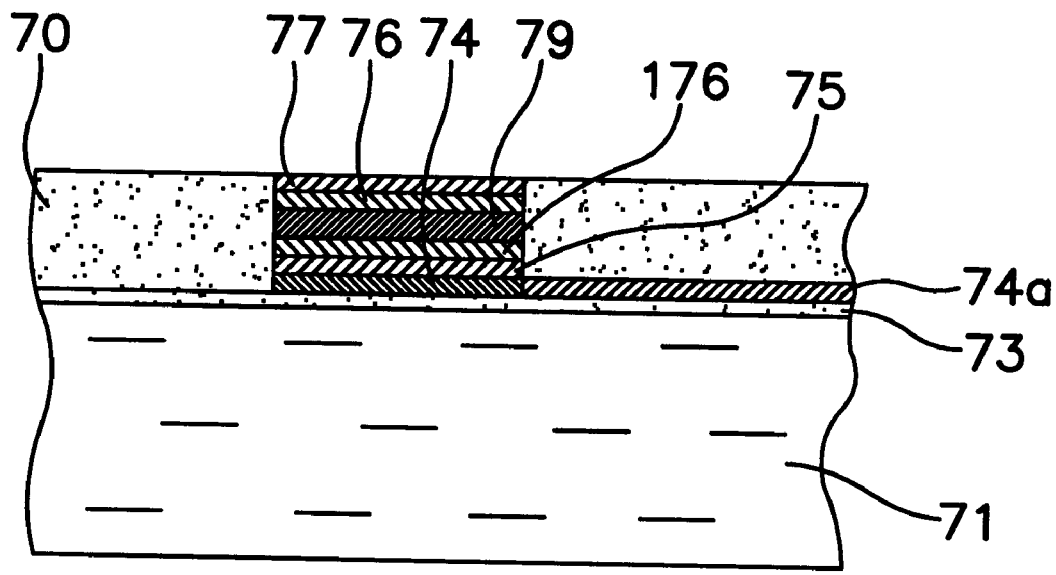
Figure 10D:
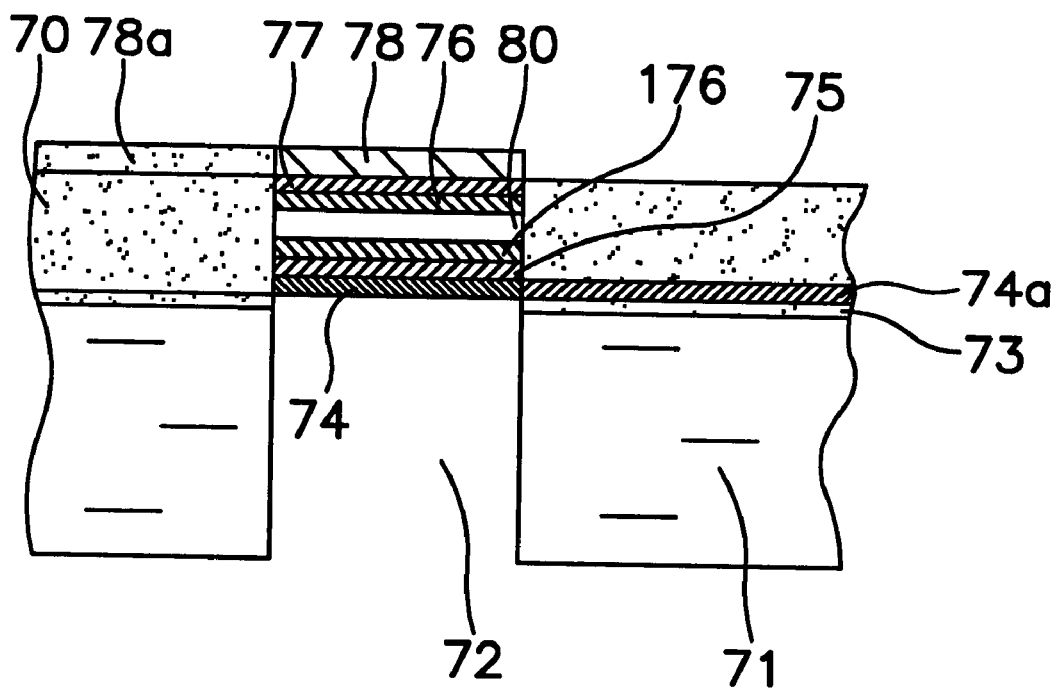

FIG. 9 is a schematic cross sectional view of a sensing element in a thermal type infrared sensing device according to the seventh embodiment of the present invention. The thermal type infrared sensing device of this embodiment is identical in structure to the thermal type infrared sensing device of the fourth embodiment, except for the provision of an inter-counter-electrode cavity. Accordingly, the structure of this embodiment is assumed to be the same as that of the fourth embodiment, except where specifically noted, and the constituent members having the same names as those in the fourth embodiment are assumed to have the same functions as those in the fourth embodiment, unless specifically noted otherwise.

An insulating film 73 is formed on a silicon semiconductor substrate 71 having a cavity 72 formed therein, and a compensation electrode 74, a dielectric film 75 in which a polarization occurs when subjected to infrared radiation, a counter electrode 176, a counter electrode 76, a dielectric film 77 of the same material, thickness, and area as the dielectric film 75, and a light-receiving electrode 78 are formed in this order from the bottom to the top directly above the cavity 72. A cavity 80 is formed between the counter electrodes 176 and 76 which are electrically interconnected. On the silicon semiconductor substrate 71, except the portion above the cavity 72, is formed a second insulating film 70 interposing between the light-receiving electrode 78 and the compensation electrode 74 or the insulating film 73. The insulating film 70 need not necessarily be formed of the same material as the insulating film 73, but if it is to be formed of the same material, the insulating film 70 may be formed integrally with the insulating film 73. Each sensing element of the thermal type infrared sensing device of the present embodiment is formed in the manner described above. The thermal type infrared sensing device of the present embodiment is constructed by forming a plurality of cavities 72 in a two-dimensional arrangement in the silicon semiconductor substrate 71 and by forming one sensing element above each cavity 72 (the entire construction is not shown here). The light-receiving electrode 78 and the compensation electrode 74 are brought out of the sensing element via respective output connection patterns 78a and 74a for connection to external electrodes (not shown). The counter electrode 76 corresponds to the first counter electrode of the present invention, and forms the light-receiving electrode pair of the present invention together with the light-receiving electrode 78, while the counter electrode 176 corresponds to the second counter electrode of the present invention, and forms the compensation electrode pair of the present invention together with the compensation electrode 74. The cavity 72 corresponds to the substrate cavity of the present invention, the cavity 80 corresponds to the inter-counter-electrode cavity of the present invention, the dielectric film 77 corresponds to the first dielectric member of the present invention, and the dielectric film 75 corresponds to the second dielectric member of the present invention.

Further, the construction is such that infrared radiation from above is allowed to enter the dielectric film 77 but not allowed to enter the dielectric film 75. For example, the light-receiving electrode 78 is made of a material that transmits infrared radiation, and the counter electrode 76 or 176 of a material that blocks the infrared radiation.

In the above arrangement, when infrared radiation is incident on the light-receiving electrode 78, the output of the light-receiving electrode 78 is compensated by an output from its associated compensation electrode 74. The absorbed heat of incident infrared radiation is dissipated into the air through the cavity 80, thus suppressing thermal crosstalk to the compensation electrode pair. If heat is generated in the compensation electrode pair due to some other factor, the presence of the cavity 72 serves to suppress the thermal crosstalk to other compensation electrode pairs.

Next, a fabrication method will be described for the thermal type infrared sensing device of the present embodiment. The thermal type infrared sensing device of the present embodiment is constructed with a two-dimensional arrangement of a plurality of sensing elements on the semiconductor substrate 71, as described above, and the plurality of sensing elements are formed simultaneously within the same fabrication process. However, the following description of the fabrication method is given focusing on one sensing element.

FIGS. 10(a) through 10(d) are schematic cross sectional views of one sensing element for explaining the fabrication method for the thermal type infrared sensing device of the present embodiment.

First, the insulating film 73 is formed on the silicon semiconductor substrate 71. The compensation electrode 74 and the connection pattern 74a connecting to it are formed on a portion of the insulating film 73, and the insulating film 70 is formed on the insulating film 73 or the connection pattern 74a, while leaving the compensation electrode 74 exposed (FIG. 10(a)). Next, the dielectric film 75 in which a polarization occurs when subjected to infrared radiation is formed on the compensation electrode 74 and, on top of the dielectric film 75, the counter electrode 176 is formed, followed by the formation of a sacrificial layer 79 thereon (FIG. 10(b)). Next, the dielectric film 77 of the same material, thickness, and area as the counter electrode 76 and the dielectric film 75 is formed on top of the sacrificial layer 79 (FIG. 10(c)). Further, the light-receiving electrode 78 is formed on the dielectric film 77 and the connection pattern 78a connecting to the light-receiving electrode 78 is formed on a portion of the insulating film 70; then, the cavity 80 is formed by etching away the sacrificial layer 79, and the cavity 72 is formed directly below the dielectric film 75 in the semiconductor substrate 71 (FIG. 10(d)). With the above process, each sensing element of the thermal type infrared sensing device of the present embodiment is formed. By forming such sensing elements in a two-dimensional arrangement on the silicon semiconductor substrate 71, the thermal type infrared sensing device of the present embodiment is fabricated.

That is, in the thermal type infrared sensing device of the present embodiment, for each light-receiving electrode pair provided to receive infrared radiation there is formed one compensation electrode pair on the back surface of the substrate of the light-receiving electrode pair. Accordingly, the construction can be made compact in size, facilitating the two-dimensional design of the device construction.

Furthermore, by forming one compensation electrode pair underneath each light-receiving electrode pair, it becomes possible to suppress the sensitivity variations between electrode pairs resulting from variations in the characteristics of the dielectric film itself, and to make the electrode area the same between them; furthermore, not only can the thermal crosstalk between the light-receiving electrode pairs be suppressed, but the thermal crosstalk from the light-receiving electrode pair to the compensation electrode pair can also be suppressed, and the miniaturization and the higher density, higher resolution design of the device construction can be achieved, thus making it possible to obtain an accurate two-dimensional temperature distribution.

In the present embodiment, the insulating film 73 has been described as not being formed on the portion above the cavity 72, but this is not an essential requirement; for example, the insulating film 73 may be formed over the entire surface of the silicon semiconductor substrate 71. That is, the only requirement is that the insulating film 70 or 73 be formed in such a manner as to ensure electrical isolation of the electrodes and dielectric films from the silicon semiconductor substrate 71.

Further, the present embodiment has been described as having the substrate cavity of the present invention in addition to the inter-counter-electrode cavity of the present invention, but it will be appreciated that with the provision of the inter-counter-electrode cavity alone, the effect of suppressing the thermal crosstalk from the light-receiving electrode pair to the compensation electrode can also be obtained.

Furthermore, the step of forming the substrate cavity of the present invention has been described in the present embodiment as being performed following the light-receiving electrode formation step, but the order is not restricted to the illustrated example; for example, the cavity formation step may be performed prior to the step of forming the compensation electrode of the present invention.

Embodiment 8

Next, an eighth embodiment of the present invention will be described with reference to drawing.

Figure 11:
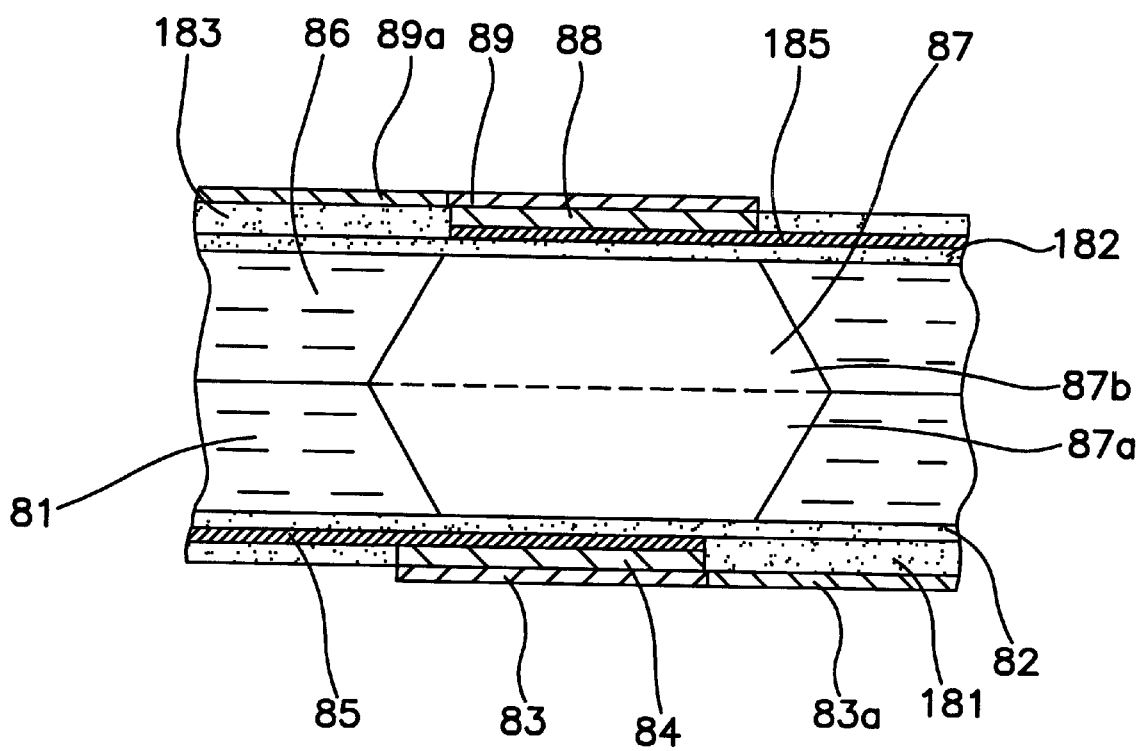
FIG. 11 is a schematic cross sectional view of a sensing element in a thermal type infrared sensing device according to an eighth embodiment of the present invention.
Figure 12A:
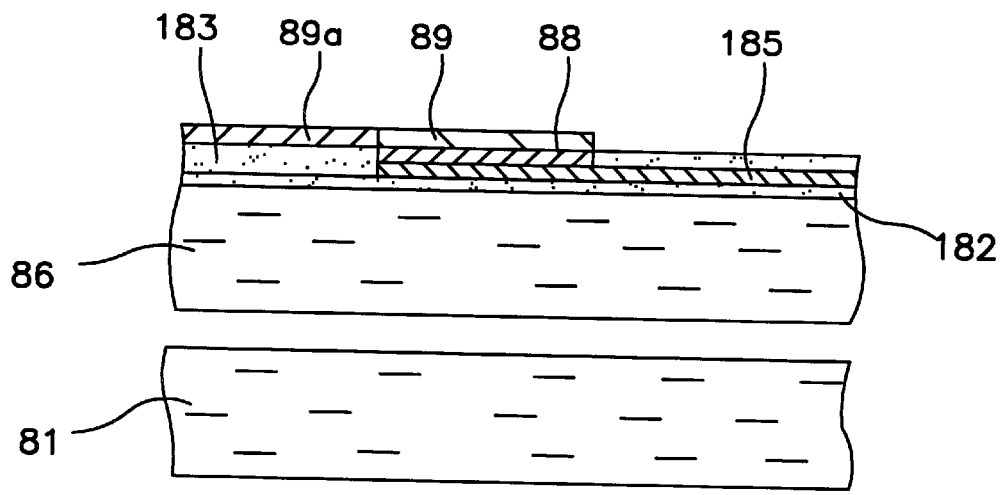
FIGS. 12(a) through 12(d) show in schematic cross sectional view four stages in the manufacturing process of one sensing element for explaining a fabrication method for the thermal type infrared sensing device of the eighth embodiment of the present invention.
Figure 12B:
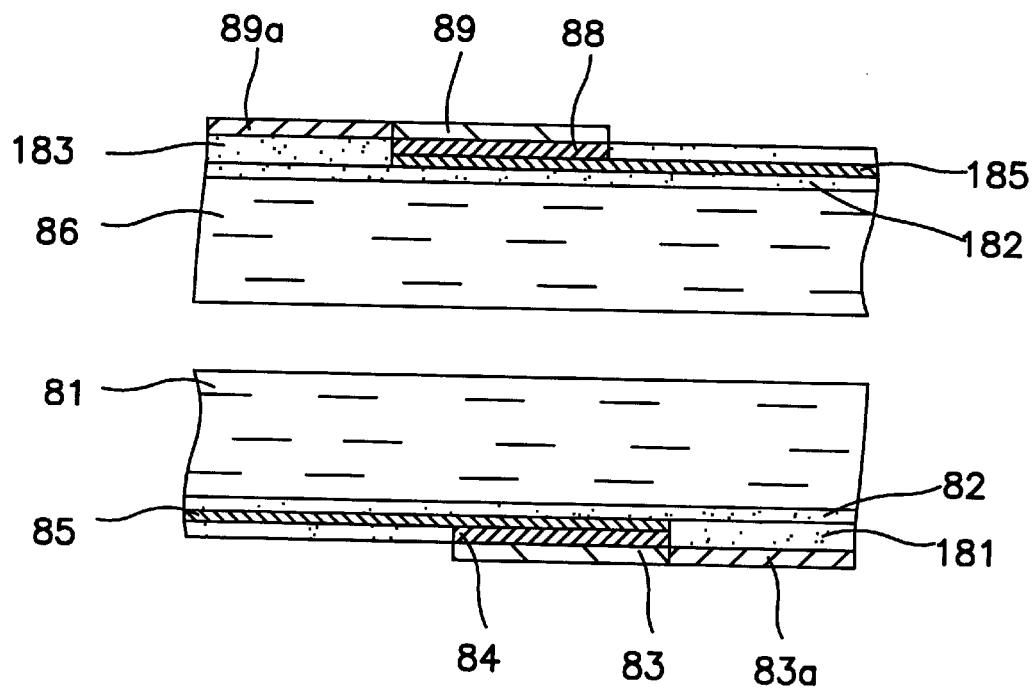
Figure 12C:
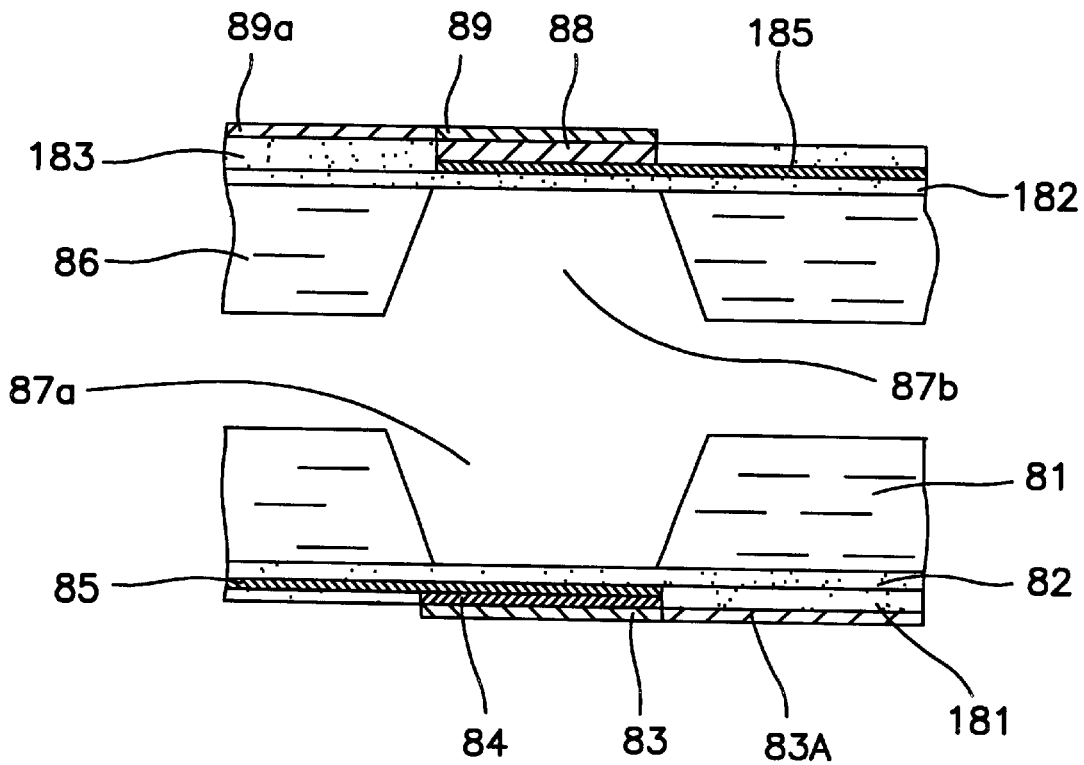
Figure 12D:
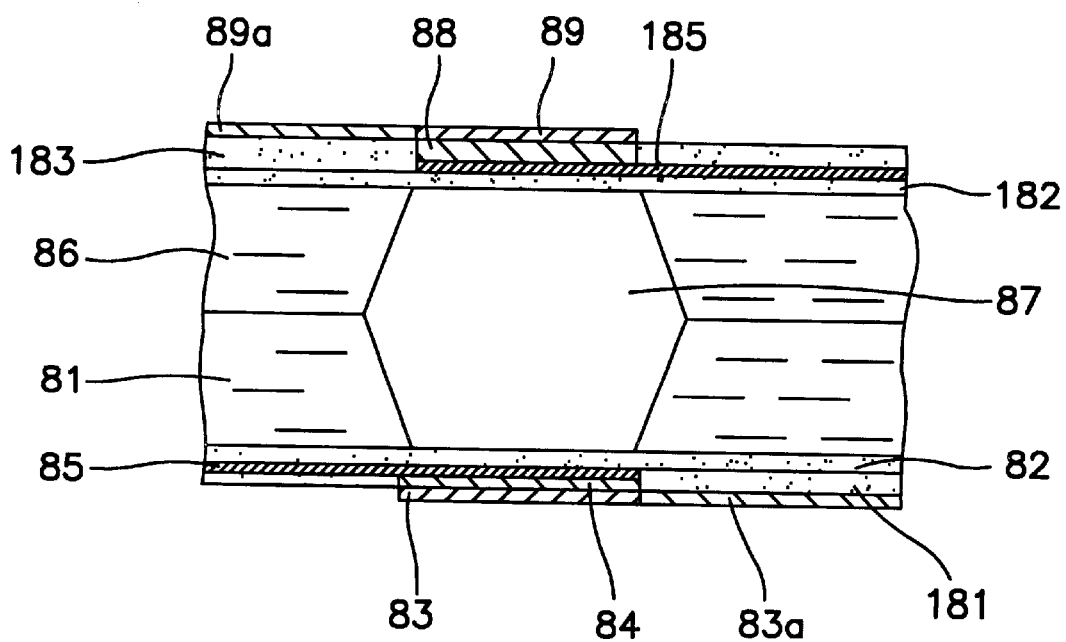

FIG. 11 is a schematic cross sectional view of a sensing element in a thermal type infrared sensing device according to the eighth embodiment of the present invention. The thermal type infrared sensing device of this embodiment is identical in structure to the thermal type infrared sensing device of the fourth embodiment, except that the light-receiving electrode pair and the compensation electrode pair are respectively formed on the upper and lower surfaces of one substrate constructed by bonding separate substrates together. Accordingly, the structure of this embodiment is assumed to be the same as that of the fourth embodiment, except where specifically noted, and the constituent members having the same names as those in the fourth embodiment are assumed to have the same functions as those in the fourth embodiment, unless specifically noted otherwise.

An insulating film 82 is formed on the lower surface of a silicon semiconductor substrate 81 having a cavity 87a formed therein, and a counter electrode 85 is formed on the insulating film 82 below the cavity 87a. Further, a dielectric film 84 in which a polarization occurs when subjected to infrared radiation is formed on the portion of the counter electrode 85 that lies directly below the cavity 87a, and further below is formed a compensation electrode 83. Likewise, an insulating film 182 is formed on the upper surface of a silicon semiconductor substrate 86 having a cavity 87b formed therein, and a counter electrode 185, which is electrically connected to the counter electrode 85, is formed on the insulating film 182 above the cavity 87b. Further, a dielectric film 88 having the same material, thickness, and area as the dielectric film 84 is formed on the portion of the counter electrode 185 that lies directly above the cavity 87b, and a light-receiving electrode 89 is formed on top of the dielectric film 88. On the silicon semiconductor substrate 81, except the portion below the cavity 87a, is formed another insulating film 181 interposing between the compensation electrode 83 and the insulating film 82 or lying under the counter electrode 85. Likewise, on the silicon semiconductor substrate 86, except the portion above the cavity 87b, is formed another insulating film 183 interposing between the light-receiving electrode 89 and the insulating film 182 or lying above the counter electrode 185. The insulating films 82 and 181 and/or the insulating films 182 and 183 need not necessarily be formed of the same material, but if they are to be formed of the same material, both films may be formed integrally. The two silicon substrates 81 and 86 are overlaid one on top of the other and bonded together with their film/electrode sides as the upper and lower surfaces of the bonded structure, and with their cavities 87a and 87b combined so as to form a cavity 87. One sensing element of the thermal type infrared sensing device of the present embodiment is formed in this way. The thermal type infrared sensing device of the present embodiment is constructed by forming a plurality of cavities 87 in a two-dimensional arrangement in the silicon semiconductor substrates 81 and 86 and by forming one sensing element for each cavity 87 (the entire construction is not shown here). The light-receiving electrode 89 and the compensation electrode 83 are brought out of the sensing element via respective output connection patterns 89a and 83a for connection to external electrodes (not shown). The counter electrode 185 corresponds to the first counter electrode of the present invention, and forms the light-receiving electrode pair of the present invention together with the light-receiving electrode 89, while the counter electrode 85 corresponds to the second counter electrode of the present invention, and forms the compensation electrode pair of the present invention together with the compensation electrode 83. The cavity 87 corresponds to the substrate cavity of the present invention, the dielectric film 88 corresponds to the first dielectric member of the present invention, and the dielectric film 84 corresponds to the second dielectric member of the present invention.

Further, the construction is such that infrared radiation from above is allowed to enter the dielectric film 88 but not allowed to enter the dielectric film 84. For example, the light-receiving electrode 89 is made of a material that transmits infrared radiation, and the counter electrode 85 of a material that blocks the infrared radiation.

In the above arrangement, when infrared radiation is incident on the light-receiving electrode 89, the output of the light-receiving electrode 89 is compensated by an output from its associated compensation electrode 83. The absorbed heat of incident infrared radiation is dissipated into the air through the cavity 87, thus suppressing thermal crosstalk to its associated compensation electrode pair as well as the thermal crosstalk to other light-receiving electrode pairs through the semiconductor substrates 81 and 86.

Next, a fabrication method will be described for the thermal type infrared sensing device of the present embodiment. The thermal type infrared sensing device of the present embodiment is constructed with a two-dimensional arrangement of a plurality of sensing elements on the semiconductor substrates 81 and 86, as described above, and the plurality of sensing elements are formed simultaneously within the same fabrication process. However, the following description of the fabrication method is given focusing on one sensing element.

FIGS. 12(a) through 12(d) are schematic cross sectional views of one sensing element for explaining the fabrication method for the thermal type infrared sensing device of the present embodiment.

First, the insulating film 182 is formed over the silicon semiconductor substrate 86. The counter electrode 185 is formed on a portion of the insulating film 182. The dielectric film 88 in which a polarization occurs when subjected to infrared radiation is formed on a portion of the counter electrode 185. While leaving the upper surface of the dielectric film 88 exposed, the insulating film 183 is formed on the insulating film 182 or the counter electrode 185, after which the light-receiving electrode 89 is formed on the dielectric film 88 and the connection pattern 89a connecting to the light-receiving electrode 89 is formed on a portion of the insulating film 183 (FIG. 12(a)). Next, the insulating film 82 is formed over the other silicon semiconductor substrate 81. The counter electrode 85 is formed on a portion of the insulating film 82. The dielectric film 84 of the same material, thickness, and area as the dielectric film 88 is formed on a portion of the counter electrode 85. While leaving the upper surface of the dielectric film 84 exposed, the insulating film 181 is formed on the insulating film 82 or the counter electrode 85, after which the compensation electrode 83 is formed on the dielectric film 84 and the connection pattern 83a connecting to the compensation electrode 83 is formed on a portion of the insulating film 181 (FIG. 12(b)). Next, the cavities 87a and 87b are formed by etching the portions of the silicon semiconductor substrates 81 and 86 that lie below the dielectric films 84 and 88 (FIG. 12(c)). Finally, the two silicon substrates 81 and 86 are overlaid one on top of the other and bonded together with their film/electrode sides as the upper and lower surfaces of the bonded structure, and with their cavities 87a and 87b combined so as to form the cavity 87. The processing step shown in FIG. 12(a) and the processing step shown in FIG. 12(b) may be performed in either order, or both may be performed concurrently.

That is, in the thermal type infrared sensing device of the present embodiment, for each light-receiving electrode pair provided to receive infrared radiation there is formed one compensation electrode pair on the back surface of the substrate opposite from the surface thereof where the light-receiving electrode pair is formed. This arrangement serves to make the construction compact, and facilitates the two-dimensional design of the device construction. Furthermore, by forming one compensation electrode pair below each light-receiving electrode pair, it becomes possible to suppress the sensitivity variations between electrode pairs resulting from variations in the characteristics of the dielectric film itself, and to make the electrode area the same between them; furthermore, not only can the thermal crosstalk between the light-receiving electrode pairs be suppressed, but the thermal crosstalk from the light-receiving electrode pair to the compensation electrode pair can also be suppressed, and the miniaturization and the higher density, higher resolution design of the device construction can be achieved, thus making it possible to obtain an accurate two-dimensional temperature distribution.

In the present embodiment, the insulating films 82 and 182 have been described as being formed over the entire surfaces of the respective silicon semiconductor substrates 81 and 86 but this is not an essential requirement; for example, the portions of the insulating films 82 and 182 that lie above (or below) the cavity 87 may be omitted. That is, the only requirement is that the insulating films 82 and 182 or 181 and 183 be formed in such a manner as to ensure electrical isolation of the electrodes and dielectric films from the respective silicon semiconductor substrates 81 and 86.

Further, in the present embodiment, the substrate cavity of the present invention has been described as being formed passing through each substrate, but the construction is not limited to the illustrated one; for example, only the cavity 87b may be provided. That is, the only requirement is that the cavity be formed in such a shape that allows the heat of incident infrared radiation absorbed by the first dielectric member of the present invention to be dissipated into the air without transferring the heat to the dielectric film 84.

Furthermore, in the present embodiment, the counter electrodes 85 and 185 have been described as being formed extending outside the portions directly above (or below) the cavity 87, but this is not an essential requirement. The only requirement is that the counter electrodes 85 and 185 be formed at least in the portions directly above (or directly below) the cavity 87 and be electrically interconnected.

Embodiment 9

Next, a ninth embodiment of the present invention will be described with reference to drawing.

Figure 13:
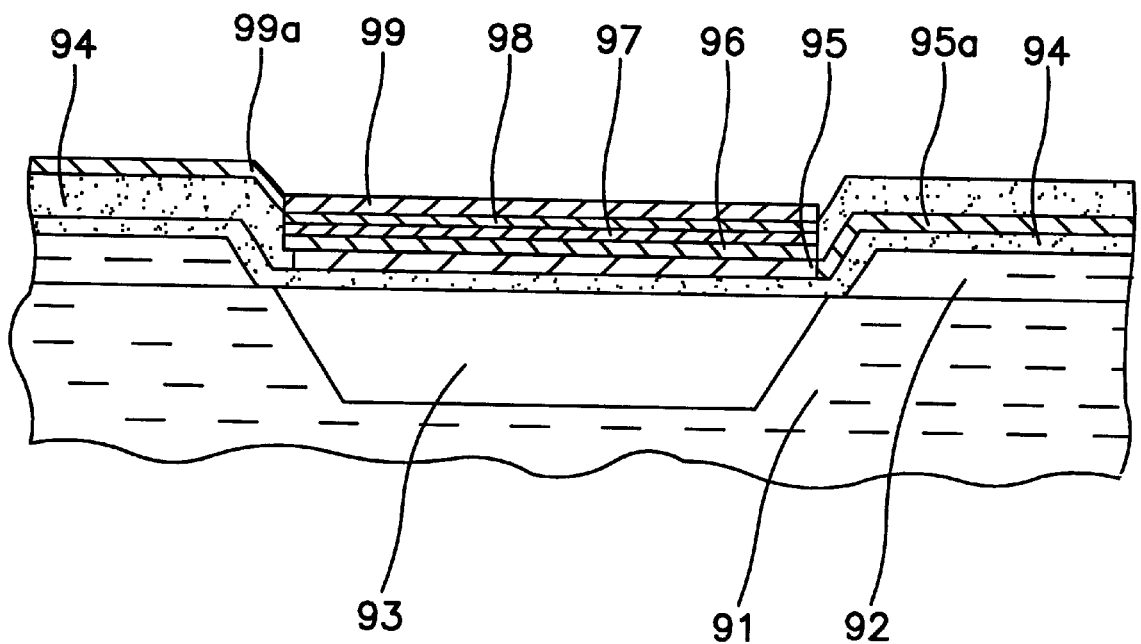
FIG. 13 is a schematic cross sectional view of a sensing element in a thermal type infrared sensing device according to a ninth embodiment of the present invention.

FIG. 13 is a schematic cross sectional view of a sensing element in a thermal type infrared sensing device according to the ninth embodiment of the present invention. The thermal type infrared sensing device of this embodiment is fundamentally the same in structure as the thermal type infrared sensing device of the fourth embodiment, except that the substrate has a step near the outer periphery of the substrate cavity. Accordingly, the structure of this embodiment is assumed to be the same as that of the fourth embodiment, except where specifically noted, and the constituent members having the same names as those in the fourth embodiment are assumed to have the same functions as those in the fourth embodiment, unless specifically noted otherwise.

A silicon semiconductor substrate 91 with a cavity 93 formed therein and a silicon semiconductor 92 having a through-hole slightly larger than the outer dimension of the cavity 93 are bonded together with the through-hole superimposed on the cavity 93, to construct a bonded substrate structure. Over the entire surface of the bonded substrate structure is formed an insulating film 94 in such a manner as to close the top of the cavity 93. On the portion of the insulating film 94 that lies above the cavity 94, there are formed a compensation electrode 95, a dielectric film 96 in which a polarization occurs when subjected to infrared radiation, a counter electrode 97, a dielectric film 98 of the same material, thickness, and area as the dielectric film 96, and a light-receiving electrode 99, stacked in this order from the bottom to the top conforming to the step of the bonded substrate structure formed by the through-hole. On the bonded substrate structure, except the portion above the cavity 93, is formed a second insulating film 90 in such a manner as to interpose between the light-receiving electrode 99 and the compensation electrode 95 or the insulating film 94. The insulating film 90 need not necessarily be formed of the same material as the insulating film 94, but if it is to be formed of the same material, the insulating film 90 may be formed integrally with the insulating film 94. Each sensing element of the thermal type infrared sensing device of the present embodiment is formed in the manner described above. The thermal type infrared sensing device of the present embodiment is constructed by forming a plurality of cavities 93 in a two-dimensional arrangement in the bonded substrate structure and by forming one sensing element above each cavity 93 (the entire construction is not shown here). The light-receiving electrode 99 and the compensation electrode 95 are brought out of the sensing element via respective output connection patterns 99a and 95a for connection to external electrodes (not shown). The counter electrode 97 corresponds to the common counter electrode of the present invention, and forms the light-receiving electrode pair of the present invention together with the light-receiving electrode 99 and the compensation electrode pair of the present invention together with the compensation electrode 95. The cavity 93 corresponds to the substrate cavity of the present invention, the dielectric film 98 corresponds to the first dielectric member of the present invention, and the dielectric film 96 corresponds to the second dielectric member of the present invention.

Further, the construction is such that infrared radiation from above is allowed to enter the dielectric film 98 but not allowed to enter the dielectric film 96. For example, the light-receiving electrode 99 is made of a material that transmits infrared radiation, and the counter electrode 97 of a material that blocks the infrared radiation.

In the above arrangement, when infrared radiation is incident on the light-receiving electrode 99, the output of the light-receiving electrode 99 is compensated by an output from its associated compensation electrode 95. The absorbed heat of incident infrared radiation is dissipated into the air through the cavity 93, thus suppressing the thermal crosstalk to other light-receiving electrode pairs occurring through the bonded substrate structure. Furthermore, because of the formation of the step, the film/electrode stack formed above the cavity 93 is located in a recessed position lower than other device surfaces. This means that the infrared radiation reaching the dielectric film 98 through the light-receiving electrode 99 has directivity in the direction perpendicular to the substrate surface.

Accordingly, the thermal type infrared sensing device of the present embodiment has the effect of providing directionality in the direction perpendicular to the substrate surface, in addition to the various effects achieved by the thermal type infrared sensing device of the fourth embodiment.

Next, a fabrication method will be described for the thermal type infrared sensing device of the present embodiment. The thermal type infrared sensing device of the present embodiment is constructed with a two-dimensional arrangement of a plurality of sensing elements on the bonded substrate structure, as described above, and the plurality of sensing elements are formed simultaneously within the same fabrication process. However, the following description of the fabrication method is given focusing on one sensing element.

FIGS. 14(a) through 14(d) are schematic cross sectional views of one sensing element for explaining the fabrication method for the thermal type infrared sensing device of the present embodiment.

Figure 14A:
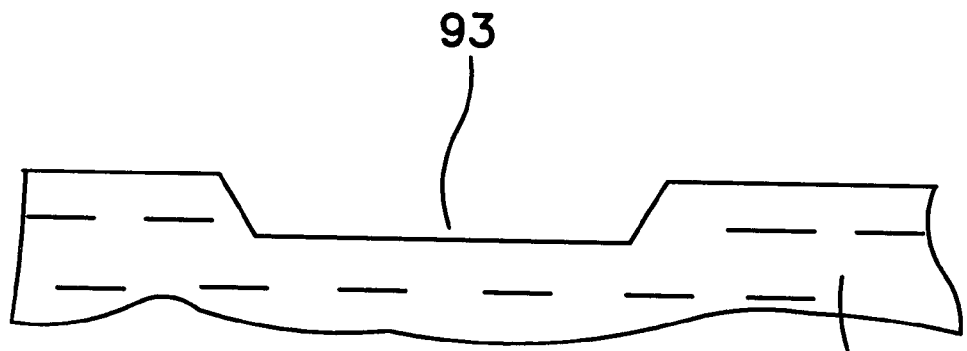
FIGS. 14(a) through 14(d) show in schematic cross sectional view four stages in the manufacturing process of one sensing element for explaining a fabrication method for the thermal type infrared sensing device of the ninth embodiment of the present invention.
Figure 14B:
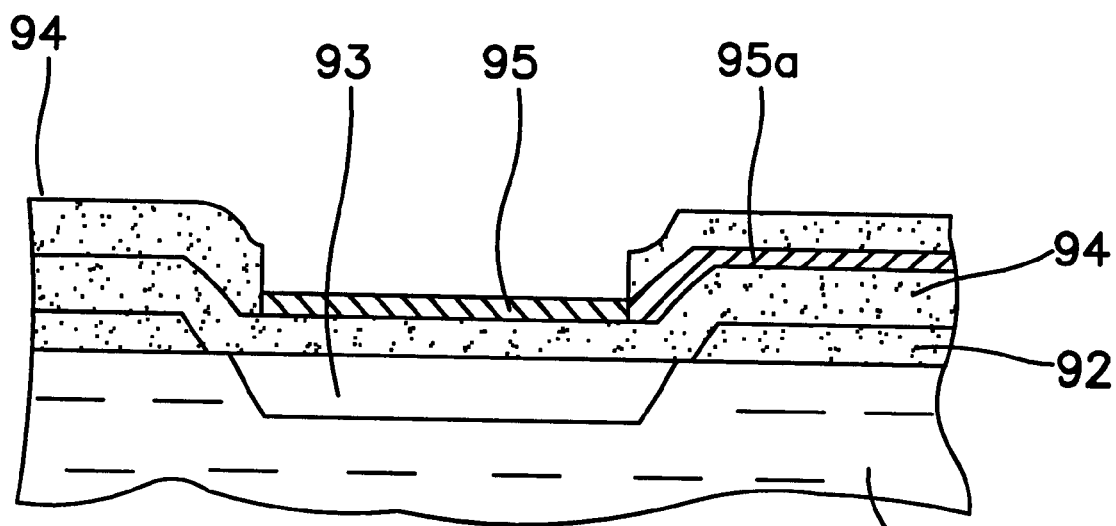
Figure 14C:
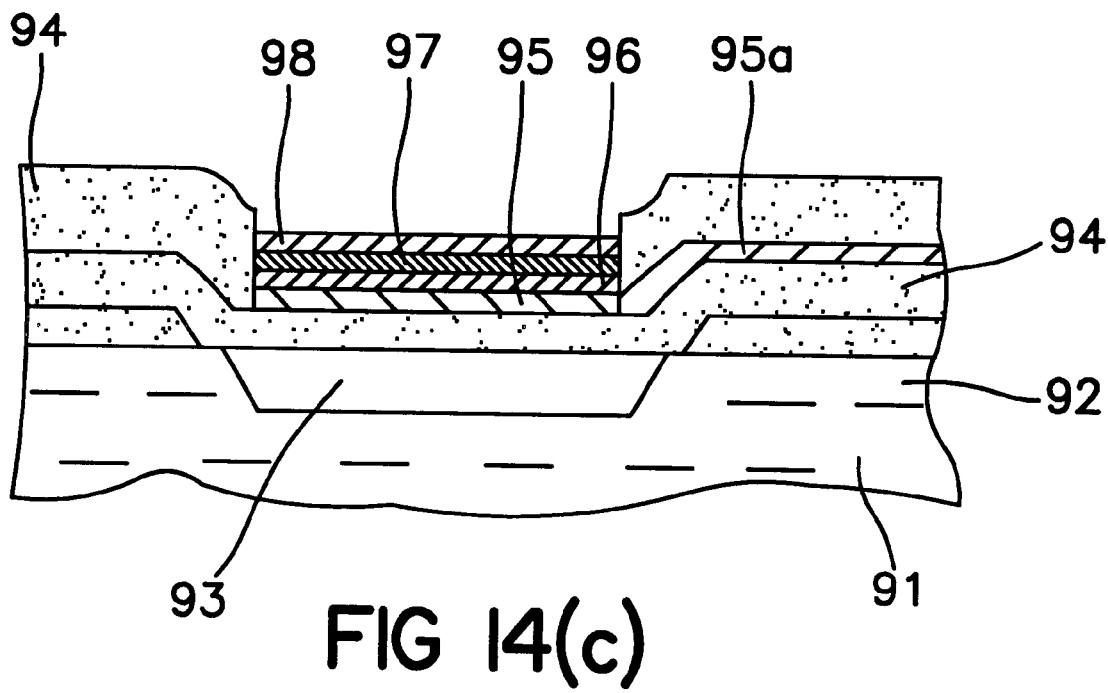
Figure 14D:
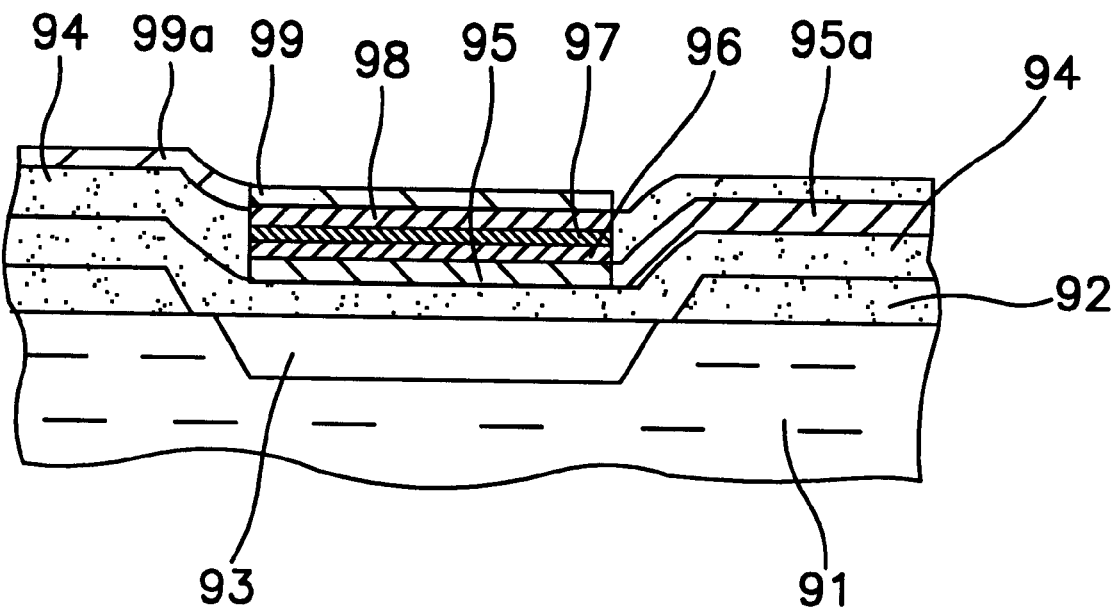

The cavity 93 is formed in the silicon semiconductor substrate 91 (FIG. 14(a)). A recessed portion is formed in the other semiconductor substrate 92 which is then bonded onto the semiconductor substrate 91 by overlaying the recessed portion on the cavity 93, and the upper surface of the bonded structure is lightly polished. The insulating film 94 is formed over the bonded structure in such a manner as to close the top of the cavity 93, and the compensation electrode 95 and its connection pattern 95a are formed on a portion of the insulating film 94. On top of that, the second insulating film 90 is formed, while leaving the upper surface of the compensation electrode 95 exposed (FIG. 14(b)). The dielectric film 96 in which a polarization occurs when subjected to infrared radiation is formed over the exposed surface of the compensation electrode 95. On top of that, the counter electrode 97 is formed, which is then covered with the dielectric film 98 of the same material, thickness, and area as the dielectric film 96 (FIG. 14(c)). The light-receiving electrode 99 is formed on the dielectric film 98, and the connection pattern 99a connecting to the light-receiving electrode 99 is formed on a portion of the insulating film 90 (FIG. 14(d)).

In the present embodiment, the step of the present invention has been described as being formed by bonding the silicon semiconductor substrate 92 having a recessed portion slightly larger than the outer dimension of the cavity 93 onto the silicon semiconductor substrate 91 in which the cavity 93 is formed, in such a manner that the recessed portion is superimposed over the cavity 93, but the structure is not limited to the illustrated one; for example, a single substrate with a preformed step may be used. Alternatively, the recessed portion may be formed after bonding the two semiconductor substrates together.

Embodiment 10

Next, a 10th embodiment of the present invention will be described with reference to drawing.

Figure 15:
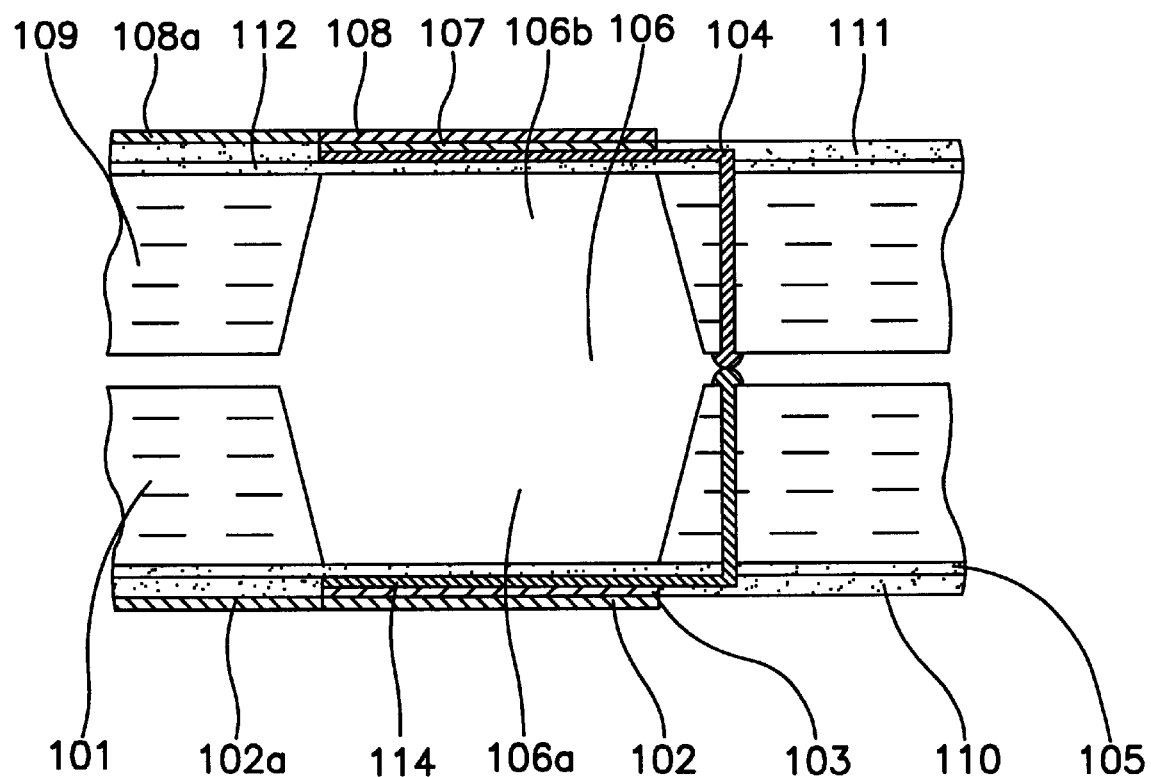
FIG. 15 is a schematic cross sectional view of a sensing element in a thermal type infrared sensing device according to a 10th embodiment of the present invention.

FIG. 15 is a schematic cross sectional view of a sensing element in a thermal type infrared sensing device according to the 10th embodiment of the present invention. The thermal type infrared sensing device of this embodiment is fundamentally the same in structure as the thermal type infrared sensing device of the eighth embodiment; the only difference is that, while the thermal type infrared sensing device of the eighth embodiment uses a single substrate constructed by bonding two separate substrates together, the present embodiment uses two separate substrates that are not bonded together but overlaid one on top of the other. Accordingly, the structure of this embodiment is assumed to be the same as that of the eighth embodiment, except where specifically noted, and the constituent members having the same names as those in the eighth embodiment are assumed to have the same functions as those in the eighth embodiment, unless specifically noted otherwise.

An insulating film 105 is formed on the lower surface of a silicon semiconductor substrate 101 having a cavity 106a formed therein, and a counter electrode 114 is formed on the insulating film 105 below the cavity 106a. Further, a dielectric film 103 in which a polarization occurs when subjected to infrared radiation is formed on the portion of the counter electrode 114 that lies directly below the cavity 106a, and further below is formed a compensation electrode 102. Likewise, an insulating film 112 is formed on the upper surface of a silicon semiconductor substrate 109 having a cavity 106b formed therein, and a counter electrode 104, which is electrically connected via a through-hole to the counter electrode 114, is formed on the insulating film 112 above the cavity 106b. Further, a dielectric film 107 having the same material, thickness, and area as the dielectric film 103 is formed on the portion of the counter electrode 104 that lies directly above the cavity 106b, and a light-receiving electrode 108 is formed on top of the dielectric film 107. On the silicon semiconductor substrate 101, except the portion below the cavity 106a, is formed another insulating film 110 interposing between the compensation electrode 102 and the insulating film 105 or lying under the counter electrode 114. Likewise, on the silicon semiconductor substrate 109, except the portion above the cavity 106b, is formed another insulating film 111 interposing between the light-receiving electrode 108 and the insulating film 112 or lying above the counter electrode 104. The insulating films 105 and 110 and/or the insulating films 112 and 111 need not necessarily be formed of the same material, but if they are to be formed of the same material, both films may be formed integrally. The two silicon substrates 101 and 109 are overlaid one on top of the other with their film/electrode sides as the upper and lower surfaces of the entire structure, and with their cavities 106a and 106b combined so as to form a cavity 106. One sensing element of the thermal type infrared sensing device of the present embodiment is formed in this way. The thermal type infrared sensing device of the present embodiment is constructed by forming a plurality of cavities 106 in a two-dimensional arrangement in the silicon semiconductor substrates 101 and 109 and by forming one sensing element for each cavity 106 (the entire construction is not shown here). The light-receiving electrode 108 and the compensation electrode 102 are brought out of the sensing element via respective output connection patterns 108a and 102a for connection to external electrodes (not shown). The counter electrode 104 corresponds to the first counter electrode of the present invention, and forms the light-receiving electrode pair of the present invention together with the light-receiving electrode 108, while the counter electrode 114 corresponds to the second counter electrode of the present invention, and forms the compensation electrode pair of the present invention together with the compensation electrode 102. The cavity 106 corresponds to the substrate cavity of the present invention, the dielectric film 107 corresponds to the first dielectric member of the present invention, and the dielectric film 103 corresponds to the second dielectric member of the present invention.

Further, the construction is such that infrared radiation from above is allowed to enter the dielectric film 107 but not allowed to enter the dielectric film 103. For example, the light-receiving electrode 108 is made of a material that transmits infrared radiation, and the counter electrode 114 of a material that blocks the infrared radiation.

In the above arrangement, when infrared radiation is incident on the light-receiving electrode 108, the output of the light-receiving electrode 108 is compensated by an output from its associated compensation electrode 102. The absorbed heat of incident infrared radiation is dissipated into the air through the cavity 106, thus suppressing thermal crosstalk to its associated compensation electrode pair as well as the thermal crosstalk to other light-receiving electrode pairs through the semiconductor substrates 101 and 109.

Embodiment 11

Next, an 11th embodiment of the present invention will be described with reference to drawing.

Figure 16:
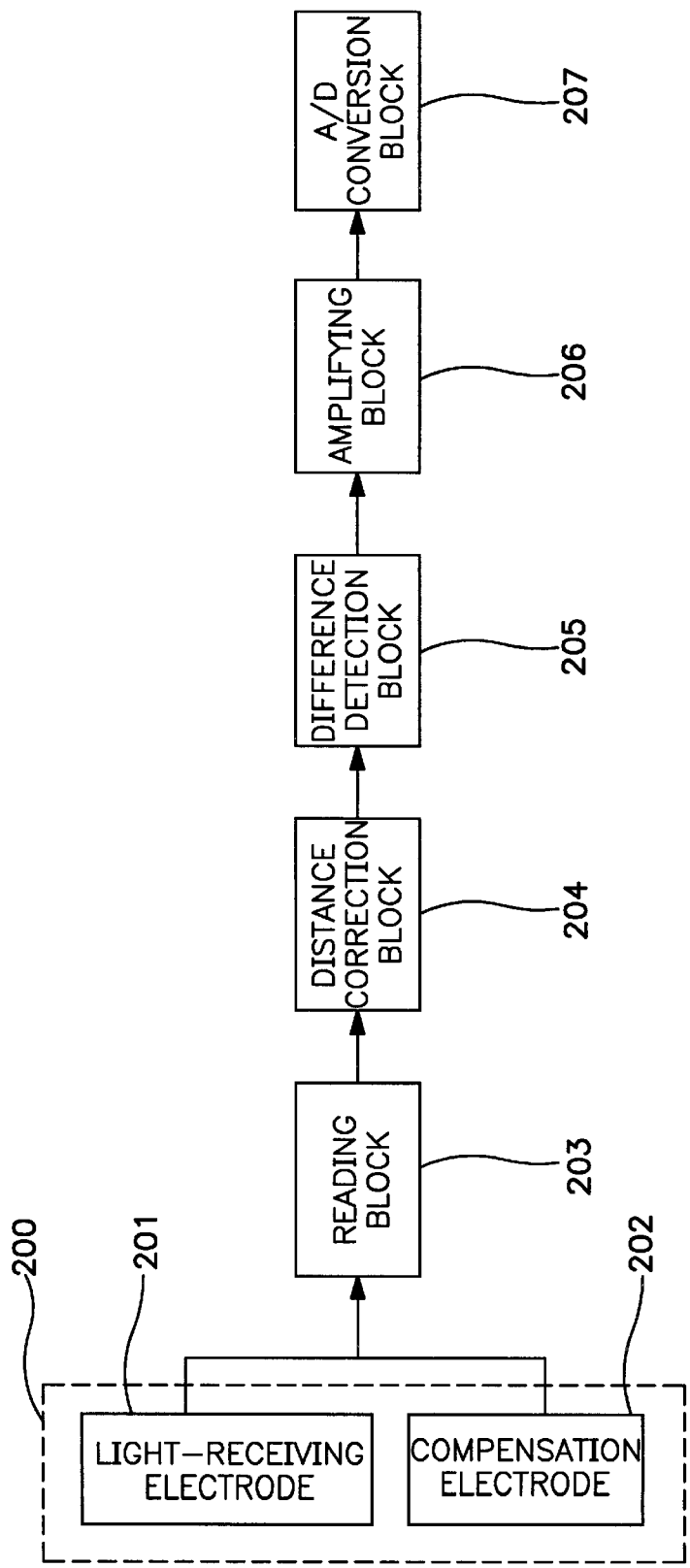
FIG. 16 is a diagram showing in simplified form the configuration of an infrared imaging system according to an 11th embodiment of the present invention.
Figure 17:
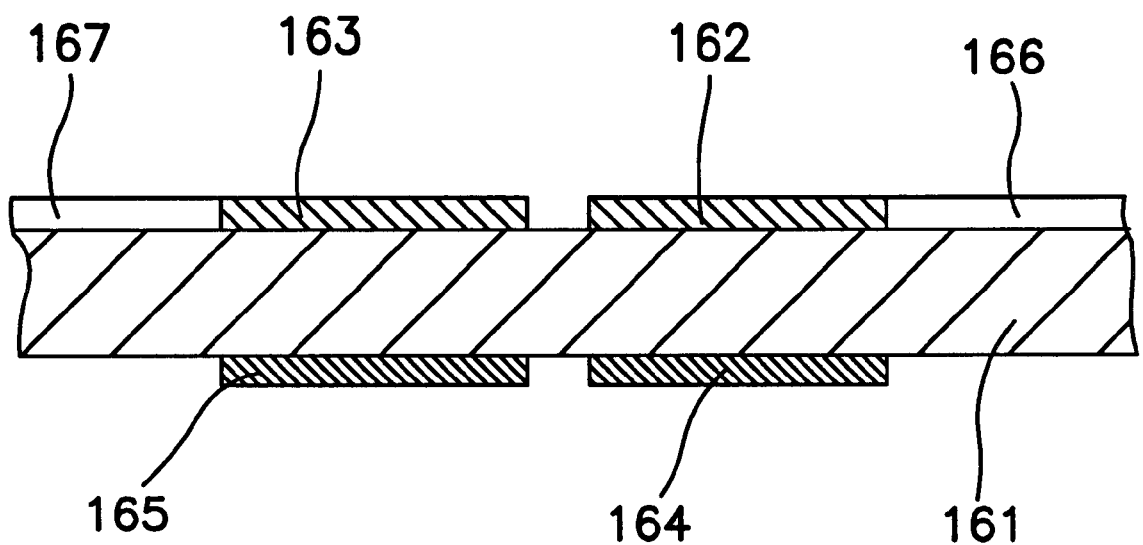
FIG. 17 is a schematic cross sectional view of a prior art pyroelectric type infrared sensor.

FIG. 16 is a diagram showing in simplified form the configuration of an infrared imaging system according to the 11th embodiment of the present invention.

The infrared imaging system of this embodiment comprises: a thermal type infrared sensing device 200 according to the present invention having a plurality of light-receiving electrodes 201 and a single compensation electrode 202 or a plurality of compensation electrodes 202; a reading block 203 which reads a signal from each electrode; a distance correction block 204 which, when processing a signal obtained from a given light-receiving electrode 201 and a signal from its associated compensation electrode 202 with infrared radiation incident on the light-receiving electrode 201, applies a distance correction by considering the distance from the compensation electrode 202 to the light-receiving electrode 201 so that the same output can be obtained regardless of the distance; a difference detection block 205 for compensating the output of the light-receiving electrode 201 by detecting the difference between the output of the compensation electrode 202 corrected by the distance correction block 204 and the output of the light-receiving electrode 201; an amplifying block 206 for amplifying an output from the difference detection block 205; and an A/D conversion block 207 for applying an analog-to-digital conversion to the output of the amplifying block 206.

In this way, by considering the distance from the compensation electrode to the light-receiving electrode, and by detecting the difference between the output of the compensation electrode and the output of the light-receiving electrode, the sensor output from any of the light-receiving electrodes can be equally compensated, making it possible to obtain an accurate sensor measurement output free from variations or errors and thus achieving accurate detection of a heat source or a human body. Furthermore, since the distance from the compensation electrode to the light-receiving electrode is corrected, and the difference between the compensation and light-receiving elements is detected, it becomes possible to suppress the sensitivity variations between sensing elements resulting from differences in connection length and variations in the characteristics of the dielectric film itself, and to prevent the blurring of infrared images; as a result, highly reliable and accurate human body and position detection can be achieved.

In the above configuration, the distance correction block 204 can be omitted if the thermal type infrared sensing device 200 is one in which the light-receiving electrode and compensation electrode are arranged one above the other as in the thermal type infrared sensing device of the fourth embodiment.

Embodiment 12

Next, a 12th embodiment of the present invention will be described.

The infrared imaging system of this embodiment is the same as the infrared imaging system of the foregoing 11th embodiment, except that immediately before or after reading the output of one light-receiving electrode, the output of its associated compensation electrode is read. Accordingly, the present embodiment is treated as being the same in configuration as the 11th embodiment, except where specifically noted.

Since the configuration of the infrared imaging system of the present embodiment is the same as that of the 11th embodiment, the description thereof is omitted, and the same reference numerals are used herein.

The feature of the infrared imaging system of the present embodiment is that when processing a signal obtained from the light-receiving electrode 201 and a signal from the compensation electrode 202 with infrared radiation incident on the light-receiving electrode 201, the reading block 203 reads the output of the light-receiving electrode 201 and the output of its associated compensation electrode 202 in alternate fashion to compensate the output of the light-receiving electrode.

That is, by forming one compensation electrode below each light-receiving electrode with a common counter electrode between them, and by reading the output of the light-receiving electrode and the output of the compensation electrode in alternate fashion, the sensor output from any of the light-receiving electrodes can be equally compensated, making it possible to obtain an accurate sensor measurement output free from variations or errors and thus achieving accurate detection of a heat source or a human body. Furthermore, since the light-receiving electrodes and compensation electrodes are formed on the same substrate, it becomes possible to suppress the sensitivity variations between sensing elements resulting from variations in the characteristics of the dielectric film itself; therefore, an accurate, high resolution infrared image can be obtained, making it possible to obtain a highly reliable and accurate two-dimensional temperature distribution.

In the present embodiment, the function of the reading block can be omitted if the thermal type infrared sensing device 200 is one in which only one compensation electrode is provided for a plurality of light-receiving electrodes, as in the thermal type infrared sensing device of the first embodiment.

The first to 12th embodiments have been described focusing on the thermal type infrared sensing device of the present invention, the fabrication method for the thermal type infrared sensing device, and the infrared imaging system. The infrared imaging apparatus of the present invention is equipped with one of the thermal type infrared sensing devices so far described or with the infrared imaging system.

As is apparent from the above description, the invention provides a low-cost thermal type infrared sensing device and a fabrication method for the same, wherein the device size is reduced to achieve the miniaturization and the two-dimensional, high-resolution design of the device construction.

Furthermore, the invention provides a low-cost thermal type infrared sensing device and a fabrication method for the same, wherein in addition to reducing the device size, the light-receiving electrodes and compensation electrodes are formed in such a manner as to suppress thermal crosstalk, thereby preventing the blurring of infrared images and achieving the miniaturization and the two-dimensional, high-resolution design of the device construction.

The invention further provides an infrared imaging system that can suppress sensitivity variations among light-receiving electrodes, is capable of accurate and substantially error-free sensing of a space to be measured, and achieves high resolution.

Further, the invention additionally provides an infrared imaging apparatus equipped with the above thermal type infrared sensing device or infrared imaging system.

What is claimed is:

1. A thermal type infrared sensing device comprising:
a plurality of light-receiving electrodes each generating a charge output when exposed to infrared radiation and a single compensation electrode for compensating the output of each of said light-receiving electrodes.

2. A thermal type infrared sensing device as set forth in claim 1, wherein
said compensation electrode is formed on the same substrate as a substrate on which said plurality of light-receiving electrodes are formed.

3. A thermal type infrared sensing device as set forth in claim 1, wherein
said compensation electrode is formed on a different substrate from a substrate on which said plurality of light-receiving electrodes are formed.

4. A thermal type infrared sensing device as set forth in claim 3, wherein
said different substrates are overlaid one on top of the other.

5. A thermal type infrared sensing device comprising:
a plurality of light-receiving electrodes each generating a charge output when exposed to infrared radiation and a plurality of compensation electrodes, corresponding one for one to said plurality of light-receiving electrodes, for compensating the outputs of said corresponding light-receiving electrodes, and wherein
said plurality of compensating electrodes are formed on a different substrate from a substrate on which said plurality of light-receiving electrodes are formed.

6. A thermal type infrared sensing device as set forth in claim 5, wherein
said different substrates are overlaid one on top of the other.

7. A thermal type infrared sensing device as set forth in claim 6 wherein
said different substrates are each formed on the same support with an insulating film layer interposed therebetween.

8. A thermal type infrared sensing device as set forth in claim 7, wherein
a dielectric member overlaps a pair of said plurality of light-receiving electrodes, and
said substrate includes a substrate cavity which is a hollow space formed at least directly below a portion where said dielectric member overlaps said pair.

9. A thermal type infrared sensing device as set forth in claim 8, wherein
said substrate cavity is formed passing through said substrate.

10. A thermal type infrared sensing device as set forth in claim 8, wherein
said substrate includes a step near an outer periphery of said substrate cavity.

11. A thermal type infrared sensing device as set forth in claim 7, wherein
a dielectric member overlaps a pair of said plurality of light-receiving electrodes, and
said insulating film layer comprises an insulating film cavity which is a hollow space formed directly below a portion where said dielectric member overlaps said pair.

12. A thermal type infrared sensing device as set forth in claim 11, wherein
said insulating film cavity is formed passing through said insulating film layer.

13. A thermal type infrared sensing device having a plurality of sensing elements each comprising: first and second dielectric members; a light-receiving electrode pair, comprising a light receiving electrode for admitting said infrared radiation into said first dielectric member and a first counter electrode disposed opposite each other across said first dielectric member; and a compensation electrode pair, comprising a compensation electrode and a second counter electrode disposed opposite each other across said second dielectric member for compensating the output of said light receiving electrode, and wherein
in each of said sensing elements, said light-receiving electrode pair with said first dielectric member sandwiched therein is formed so as to be laid over said compensation electrode pair with said second dielectric member sandwiched therein;

said second dielectric member is shielded from said infrared radiation by said first counter electrode, said first counter electrode comprising a material that blocks infrared radiation from passing therethrough; and said first counter electrode and said second counter electrode in each of said sensing elements are electrically interconnected.

14. A thermal type infrared sensing device as set forth in claim 13, wherein in each of said sensing elements said electrodes and said dielectric members are stacked one on top of another from bottom to top in the order Of said compensation electrode, said second dielectric member, said second counter electrode, said first counter electrode, said first dielectric member, and said light-receiving electrode.

15. A thermal type infrared sensing device as set forth in claim 14, wherein each of said sensing elements has an inter-counter-electrode cavity which is a hollow space formed between said first counter electrode and said second counter electrode.

16. A thermal type infrared sensing device as set forth in claim 14, wherein said first counter electrodes are each formed on one surface of the same substrate with a first insulating film layer interposed between the first counter electrodes and the substrate, and said second counter electrodes are each formed on the opposite surface of said same substrate with a second insulating film layer interposed between the second counter electrodes and the substrate.

17. A thermal type infrared sensing device as set forth in claim 14, wherein said first counter electrode is formed on one surface of a first substrate with a first insulating film layer interposed between the first couter electrodes and the first substrate, and said second counter electrode is formed on one surface of a second substrate with a second insulating film layer interposed between the second counter electrode and the second substrate, said second substrate being laid over the other surface of said first substrate and said one surface of said second substrate being opposite from the surface thereof facing said other surface of said first substrate.

18. A thermal type infrared sensing device as set forth in claim 13 wherein said first dielectric members in said plurality of sensing elements are a single continuous dielectric member, and/or said second dielectric members in said plurality of sensing elements are a single continuous dielectric member.

19. A method for fabricating a thermal type infrared sensing device, comprising the steps of: forming a compensation electrode on a substrate; forming a second dielectric member on top of said compensation electrode; forming a second counter electrode on top of said second dielectric member; forming an infrared radiation blocking first counter electrode on top of said second counter electrode; forming a first dielectric member on top of said first counter electrode; and forming an infrared radiation transparent light-receiving electrode on top of said first dielectric member.

20. A method for fabricating a thermal type infrared sensing device according to claim 19, including the step of forming an inter-counter-electrode cavity between said second counter electrode and said first counter electrode.

21. A method for fabricating a thermal type infrared sensing device according to claim 20, wherein the step of forming said inter-counter-electrode cavity includes the steps of; forming a sacrificial layer over said second counter electrode before the step of forming said first counter electrode; and removing said sacrificial layer after the step of forming said first counter electrode.

22. A method for fabricating a thermal type infrared sensing device according to claim 19, including the step of forming a substrate cavity in said substrate at least in a position lying directly below a portion where said first dielectric member, said light receiving electrode, and said first counter electrode overlap one another.

23. A method for fabricating a thermal type infrared sensing device, comprising the steps of: forming a compensation electrode on a substrate; forming a second dielectric member on top of said compensation electrode; forming an infrared radiation blocking common counter electrode on top of said second dielectric member; forming a first dielectric member on top of said common counter electrode; and forming an infrared radiation transparent light-receiving electrode on top of said first dielectric member.

24. A method for fabricating a thermal type infrared sensing device, comprising the steps of: forming an infrared radiation blocking first counter electrode on a first substrate; forming a first dielectric member on top of said first counter electrode; forming an infrared radiation transparent light-receiving electrode on top of said first dielectric member; forming a second counter electrode on a second substrate; forming a second dielectric member on top of said second counter electrode; forming a compensation electrode on top of said second dielectric member; and combining said first and second substrates into a single substrate by bonding together opposing surfaces of said first and second substrates, said opposing surfaces being opposite from the surfaces containing said first or said second counter electrode.

25. A pyroelectric infrared sensing device having a plurality of sensing elements each comprising: first and second dielectric members; a light-receiving electrode pair, comprising a light receiving electrode for admitting said infrared radiation into said first dielectric member and a common counter electrode disposed opposite each other across said first dielectric member; and a compensation electrode pair, comprising a compensation electrode and said common counter electrode disposed opposite each other across said second dielectric member for compensating the output of said light receiving electrode, and wherein in each of said sensing elements, said light-receiving electrode pair with said first dielectric member sandwiched therein is formed so as to be laid over said compensation electrode pair with said second dielectric member sandwiched therein; and said second dielectric member is shielded from said infrared radiation by said common counter electrode, said common counter electrode comprising a material that blocks infrared radiation from passing therethrough.

26. An infrared imaging system comprising a thermal type infrared sensing device comprising:

a plurality of light-receiving electrodes each generating a charge output when exposed to infrared radiation, a single compensation electrode; and compensation means for compensating the output of each of said light-receiving electrodes by an output from said compensation electrode.

27. An infrared imaging system comprising a thermal type infrared sensing device comprising:

a plurality of light-receiving electrodes each generating a charge output when exposed to infrared radiation and a plurality of compensation electrodes, corresponding one for one to said plurality of light-receiving electrodes, for compensating the outputs of said corresponding light-receiving electrodes, wherein said plurality of compensating electrodes are formed on a different substrate from a substrate on which said plurality of light-receiving electrodes are formed; and compensation means for compensating the output of each of said light-receiving electrodes by an output from its associated compensation electrode.

28. An infrared imaging system according to claim 27 wherein said compensation means performs said compensation by considering the distance from each of said light-receiving electrodes to said associated compensation electrode.

29. An infrared imaging system according to claim 27 wherein immediately before or after reading the output of one of said light receiving electrodes, said compensation means reads the output of its associated compensation electrode.

30. An imaging system comprising a pyroelectric infrared sensing device having a plurality of sensing elements each comprising: first and second dielectric members; a light-receiving electrode pair, comprising a light receiving electrode for admitting said infrared radiation into said first dielectric member and a first counter electrode disposed opposite each other across said first dielectric member; and a compensation electrode pair, comprising a compensation electrode and a second counter electrode disposed opposite each other across said second dielectric member for compensating the output of said light receiving electrode, and wherein in each of said sensing elements, said light-receiving electrode pair with said first dielectric member sandwiched therein is formed so as to be laid over said compensation electrode pair with said second dielectric member sandwiched therein and wherein said second dielectric member is shielded from said infrared radiation by said first counter electrode, said first counter electrode comprising a material that blocks infrared radiation from passing therethrough; and compensation means for compensating the output of each of said light-sensitive electrodes by an output from its associated compensation electrode.

31. An infrared imaging apparatus comprising a thermal type infrared sensing device comprising:

a plurality of light-receiving electrodes each generating a charge output when exposed to infrared, a single compensation electrode and compensation means connected to said sensing device for receiving said charge and for compensating the output of each of said light-receiving electrodes by an output from said compensation electrode; and wherein said compensation electrode and said plurality of light-receiving electrodes are formed on a substrate.

32. An infrared imaging apparatus comprising a thermal type infrared sensing device comprising:

a plurality of light-receiving electrodes each generating a charge output when exposed to infrared radiation and a plurality of compensation electrodes, corresponding one for one to said plurality of light-receiving electrodes, for compensating the outputs of said corresponding light-receiving electrodes, and wherein said plurality of compensating electrodes are formed on a different substrate from a substrate on which said plurality of light-receiving electrodes are formed; and compensation means connected to said sensing device for receiving said charge and for compensating the output of each of said light-receiving electrodes by an output from its associated compensation electrode.

33. Apparatus according to claim 32 wherein said compensation means performs said compensation by considering the distance from each of said light-receiving electrodes to said associated compensation electrode.

34. An infrared imaging apparatus comprising a pyroelectric infrared sensing device having a plurality of sensing elements each comprising: first and second dielectric members; a light-receiving electrode pair, comprising a light receiving electrode for admitting said infrared radiation into said first dielectric member and a first counter electrode disposed opposite each other across said first dielectric member; and a compensation electrode pair, comprising a compensation electrode and a second counter electrode disposed opposite each other across said second dielectric member for compensating the output of said light receiving electrode, and wherein in each of said sensing elements, said light-receiving electrode pair with said first dielectric member sandwiched therein is formed so as to be laid over said compensation electrode pair with said second dielectric member sandwiched therein and wherein said second dielectric member is shielded from said infrared radiation by said first counter electrode, said first counter electrode comprising a material that blocks infrared radiation from passing therethrough; and compensation means connected to said sensing device for receiving said charge and for compensating the output of each of said light-sensitive electrodes by an output from its associated compensation electrode.

* * * * *

UNITED STATES PATENT AND TRADEMARK OFFICE
CERTIFICATE OF CORRECTION

PATENT NO. : 6,262,418 B1 Page 1 of 1
DATED : July 17, 2001
INVENTOR(S) : Hashimoto et al.

It is certified that error appears in the above-identified patent and that said Letters Patent is hereby corrected as shown below:

<u>Column 24,</u>
Lines 22 and 23, "therebewteen" should read -- therebetween --.

<u>Column 25,</u>
Line 12, "Of" should read -- of --.
Line 37, "couter" should read -- counter --.

Signed and Sealed this

Eighteenth Day of June, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,262,418 B1
DATED : July 17, 2001
INVENTOR(S) : Hashimoto et al.

It is certified that error appears in the above-identified patent and that said Letters Patent is hereby corrected as shown below:

Title page,
Item [73], Assignee, "Matsushita Electric Industrial Co., Ltd., Osaka (JP)" should read -- Matsushita Electric Industrial Co., Ltd, Osaka (JP) and Masanori Okuyama, Osaka (JP). --

Signed and Sealed this

Twenty-first Day of June, 2005

JON W. DUDAS
*Director of the United States Patent and Trademark Office*